United States Patent
Cao

(10) Patent No.: US 6,459,528 B1
(45) Date of Patent: *Oct. 1, 2002

(54) OPTICAL PASSIVE COMPONENTS AND BI-DIRECTIONAL AMPLIFIER

(75) Inventor: Simon Cao, Pleasanton, CA (US)

(73) Assignee: Avanex Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,299

(22) Filed: May 23, 2000

(51) Int. Cl.[7] .................................................. H01S 3/00
(52) U.S. Cl. ................................................... 359/341.2
(58) Field of Search ............................. 372/703, 341.2, 372/341.3, 337.1; 359/337.22, 484, 494, 495

(56) References Cited

U.S. PATENT DOCUMENTS

| | | | |
|---|---|---|---|
| 5,280,549 A | 1/1994 | Barnard et al. ............... 385/15 |
| 5,452,124 A | 9/1995 | Baker ........................... 359/341 |
| 5,499,132 A | 3/1996 | Tojo et al. ................... 359/281 |
| 5,548,438 A | 8/1996 | Delavaux ..................... 359/341 |
| 5,600,468 A | 2/1997 | Barber ......................... 359/127 |
| 5,604,627 A | 2/1997 | Kohn ........................... 359/341 |
| 5,652,675 A | 7/1997 | Shibuya ....................... 359/341 |
| 5,740,289 A | 4/1998 | Glance ......................... 385/24 |
| 5,742,416 A | 4/1998 | Mizrahi ........................ 359/134 |
| 5,748,363 A | 5/1998 | Duck et al. .................. 359/341 |
| 5,757,541 A | 5/1998 | Fidric .......................... 359/341 |
| 5,801,858 A | 9/1998 | Roberts et al. .............. 359/114 |
| 5,812,306 A | 9/1998 | Mizrahi ........................ 359/341 |
| 5,815,308 A | 9/1998 | Kim et al. ................... 359/341 |
| 5,880,875 A * | 3/1999 | Kim ............................. 359/341 |
| 5,887,091 A | 3/1999 | Jabr et al. ..................... 385/24 |
| 5,912,766 A * | 6/1999 | Pattie .......................... 359/484 |
| 5,936,768 A | 8/1999 | Oguma ......................... 359/484 |
| 6,097,533 A * | 8/2000 | Atlas ............................ 359/337 |
| 6,101,026 A * | 8/2000 | Baney .......................... 359/341 |
| 6,169,604 B1 | 1/2001 | Cao | |
| 6,317,527 B1 * | 11/2001 | Yelamarty .................... 385/11 |

FOREIGN PATENT DOCUMENTS

DE 0849901 A2 * 8/1997 ........... H04B/10/24

OTHER PUBLICATIONS

Yadlowsky, Michael, "Bidirectional Optical Amplifiers for High Performance WDM Systems", OSA TOPS vol. 16 Optical Amplifiers and their Applications, 1997, pp. 307–324.*

Barnard, C.W. and Chrostowski, J., "Bidirectional Fiber Amplifiers", IEEE Photonics Technology Letters, vol. 4, No. 8, pp. 911–913 (1992).

Kani, J. and Jinno, M. "Bidirectional Transmission to Suppress Interwavelength–Band Nonlinear Interactions in Ultrawide–Band WDM Transmission Systems", IEEE Photonics Technology Letters, vol 11, No. 3, pp. 376–378 (Mar. 1999).

(List continued on next page.)

Primary Examiner—Thomas H. Tarcza
Assistant Examiner—Deandra M. Hughes
(74) Attorney, Agent, or Firm—Staas & Halsey LLP

(57) ABSTRACT

A bi-directional polarization independent optical isolator and monitor/amplifier system simultaneously transmits two separate signal rays in opposite forward directions while simultaneously suppressing backward transmission of each signal ray in its respective reverse direction. Both of the counter-propagating signal rays are amplified within an optical gain element. The separate signal rays include either two wavelength bands completely separated in wavelength or two sets of wavelengths, each of a plurality of wavelengths, such that wavelengths of the two signal rays are interspersed in alternating fashion.

20 Claims, 26 Drawing Sheets

OTHER PUBLICATIONS

Kim, C.H. and Chung, Y.C., "2.5 Gb/s X 16–Channel Bidirectional WDM Transmission System Using Bidirectional Erbium–Doped Fiber Amplifier Based on Spectrally Interleaved Synchronized Etalon Filters", IEEE Photonics Technology Letters, vol. 11, No. 6, pp. 745–747 (Jun. 1999).

Liaw, S.K., Ho, K.P. Lin, C. and Chi, S., "Multichannel Bidirectional Transmission Using a WDM MUX/DMUX Pair and Unidirectional In–Line Amplifiers", IEEE Photonics Technology Letters, vol. 9, No. 12, pp. 1664–1666 (Dec. 1997).

Cheng, Y.H., Kagi, N., Oyobe, A. and Nakamura, K., "Novel Fibre Amplifier Configuration Suitable for Bidirectional System", Electronics Letters, vol. 28, No. 6, pp. 28, 559–561 (Mar. 12, 1992).

Oskar van Deventer, M. and Koning, O.J., "Bidirectional Transmission Using an Erbium–Doped Fiber Amplifier Without Optical Isolators", IEEE Photonics Technology Letters, vol. 7, No. 11, pp. 1372–1374 (Nov. 1995).

Cheng, Y.H., Kagi, N., Oyobe, A. and Nakamura, K., "622 Mb/, 144 km Transmission Using a Bidirectional Fiber Amplifier Repeater", IEEE Photonics Technology Letters, vol. 5, No. 3, pp. 356–358 (Mar. 1993).

Sekai, S., Shimokado, S. and Kusunoki, K., "Novel Optical Circuit Suitable for Wavelength Division Bidirectional Optical Amplification", Electronics Letters, vol. 29, No. 14, pp. 1268–1270 (Jul. 8, 1993).

Farré, J. Bødtker, E., Jacobsen, G. and Stubkjær, K.E., "Design of Bidirectional Communication Systems with Optical Amplifiers", IEEE Photonics Technology Letters, vol. 4, No. 4, pp. 425–427 (Apr. 1993).

Haugen, J., Freeman, J. and Conradi, J. "Bidirectional Transmission at 622 Mb/s Utilizing Erbium–Dpoed Fiber Amplifiers",IEEE Photonics Technology Letters, vol. 4, No. 8, pp. 913–916 (Aug. 1992).

Orazi, R. and McLandrich, M.N., "Bidirectional Transmission at 1.55 Microns Using Fused Fiber Narrow Channel Wavelength Division Multiplexors and Erbium–Doped Fiber Amplifiers", IEEE Photonics Technology Letters, vol. 6, No. 4, pp. 571–574 (Apr. 1994).

Seikai, S., Tohi, T. and Kanaoka, Y., "Erbium–Doped Fibre Amplifier Circuit Having a Subsidiary Erbium Doped Fiber Useful for Bidirectional Optical Transmission Systems", Electronics Letters, vol. 30, No. 22, pp. 1877–1878 (Oct. 1994).

Seikai, S. Kusunoki, K. and Shimokado, S., "Experimental Studies on Wavelength Division Bidirectional Optical Amplifiers Using an $Er^{3+}$–Doped Fiber", Journal of Lightwave Technology, vol. 12, No. 5, pp. 849–853 (May 1994).

Kreifeldt, E., "Avanex Emerges with 'Photonic Processor' Technology", http://news.fiberopticsoline.com/news–analysis/19990429–1759.html, pp. 1–6, Apr. 29, 1999.

International Search Report dated Aug. 15, 2001 from corresponding PCT application No. PCT/US01/14875.

U.S. patent application Ser. No. 09/437,791, Cao, filed Nov. 10, 1999.

U.S. patent application Ser. No. 09/388,350, Cao and Mao, filed Sep. 01, 1999.

U.S. patent application Ser. No. 09/438,043, Cao, filed Nov. 10, 1999.

* cited by examiner

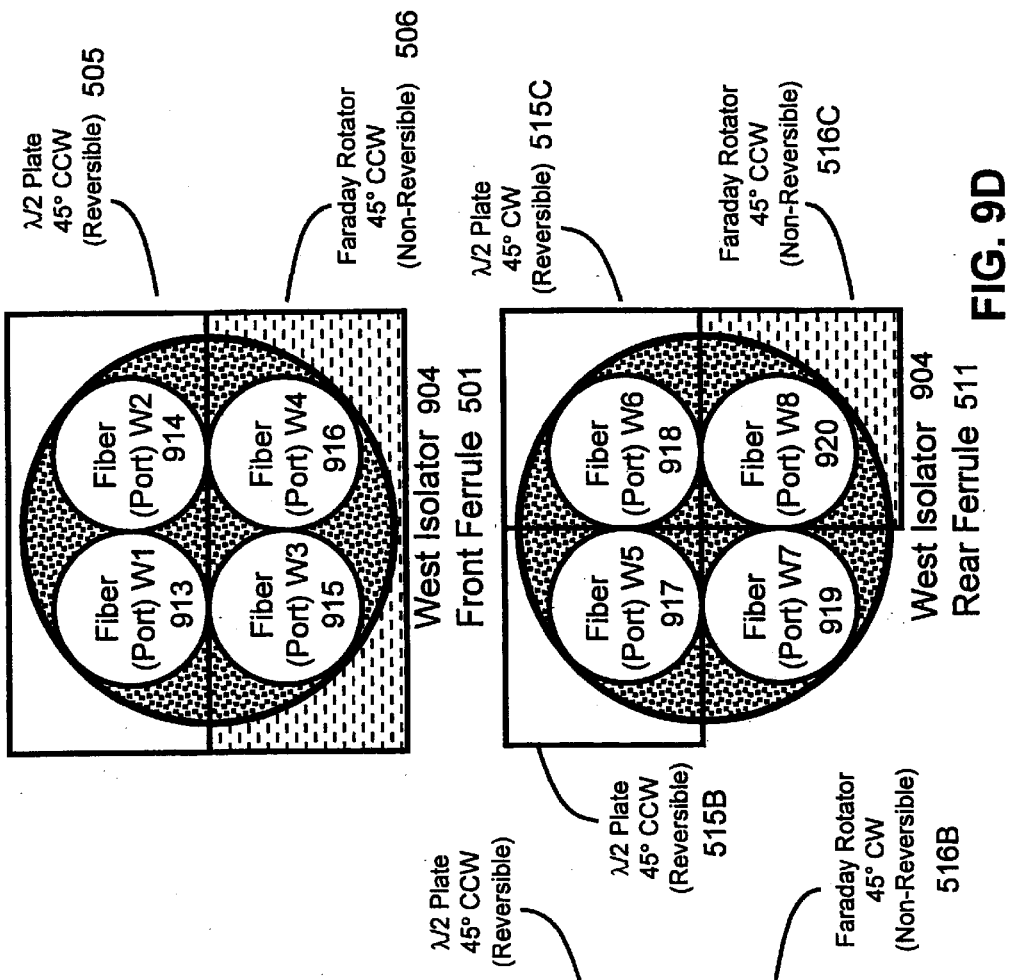
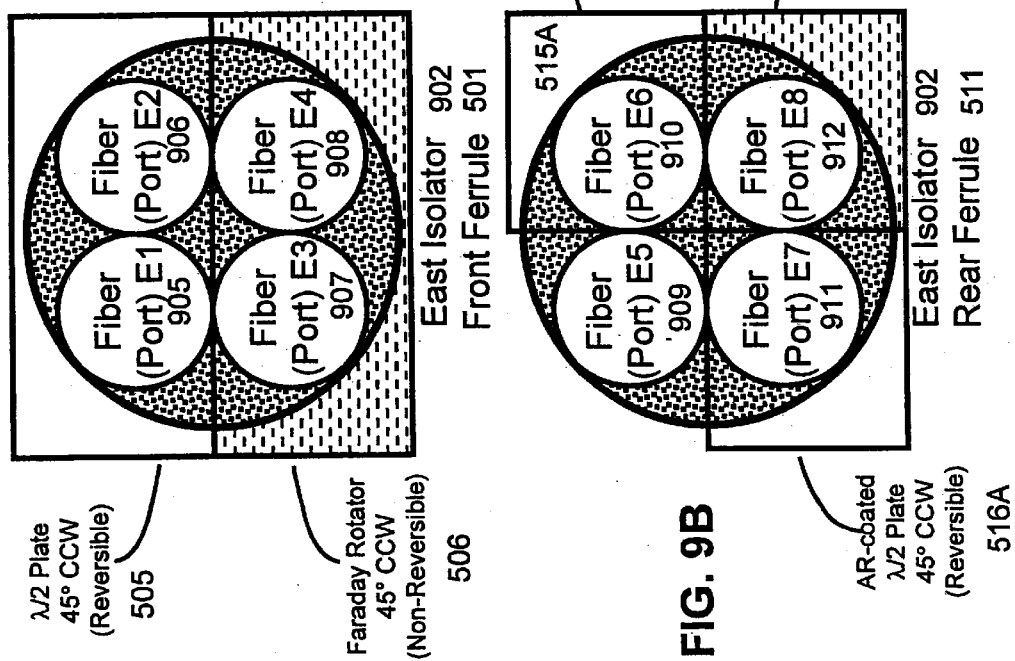
FIG. 9A  FIG. 9B  FIG. 9C  FIG. 9D

OPTICAL PASSIVE COMPONENTS AND BI-DIRECTIONAL AMPLIFIER

CROSS-REFERENCE TO RELATED APPLICATIONS

This application is related to U.S. Patent Application entitled Reflection-Type Polarization-Independent Optical Isolator, Optical Isolator/Amplifier/Monitor, and Optical System, by Simon Cao, U.S. Ser. No. 09/437,791, filed Nov. 10, 1999 and incorporated herein by reference.

This application is also related to U.S. Patent Application entitled Nonlinear Interferometer for Fiber Optic Dense Wavelength Division Multiplexer Utilizing a Phase Bias Element to Separate Wavelengths in an Optical Signal, by Simon Cao, filed on Feb. 10, 1999, U.S. Pat. No. 6,169,604, incorporated herein by reference.

This application is related to U.S. application entitled Bi-Directional Polarization-Independent Optical Isolator, U.S. Ser. No. 09/438,043 by Simon Cao, filed Nov. 10, 1999 and incorporated by reference herein.

This application is further related to U.S. application entitled Dense Wavelength Division Multiplexer Utilizing an Asymmetric Pass Band Interferometer, U.S. Pat. No. 6,310,690, by Simon X. F. Cao and Xiaoping Mao, filed Sep. 1, 1999 and incorporated by reference herein.

BACKGROUND OF THE INVENTION

1. Field of the Invention

This invention relates to optical passive components used in conjunction with a bi-directional amplifier system capable of simultaneously and independently providing optical amplification to light-wave data channels propagating in opposite directions through an optical fiber.

2. Description of the Related Art

The use of optical fiber for long-distance transmission of voice and/or data is now common. As the demand for data carrying capacity continues to increase, there is a continuing need to augment the amount of actual fiber-optic cable as well as to utilize the bandwidth of existing fiber-optic cable more efficiently. The latter practice of increasing the carrying capacity of existing fiber cable is sometimes referred to as the creation of "virtual fiber" and is clearly more cost effective than adding real fiber.

One of the ways in which "virtual" fiber is created is through the practice of Wavelength Division Multiplexing (WDM) in which multiple information channels are independently transmitted over the same fiber using multiple wavelengths of light. In this practice, each light-wave-propagated information channel corresponds to light within a specific wavelength range or "band." To increase data carrying capacity in a given direction, the number of such channels or bands must be increased.

Additionally, it is desirable to use existing fiber for bi-directional communications. More particularly, through the use of WDM, a single optical fiber may be used to transmit, both simultaneously and independently, both east-bound (northbound) as well as westbound (southbound) data.

This bi-directional data-carrying capability of optical fiber increases the need for additional channels still further. However, since all the channels (wavelength bands) must reside within specific low-loss wavelength regions determined by the properties of existing optical fiber, increased channel capacity requires increased channel density. Thus, as the need for increased data carrying capacity escalates, the demands on WDM optical components-to transmit increasing numbers of more closely spaced channels with no interference or "crosstalk" between them and over long distances-becomes more severe.

Optical amplifiers are important components of fiber-optic communication systems. Traditionally, signal regeneration has been accomplished through the use of repeaters, which are combinations of demultiplexers, receivers, signal recovery electronics, transmitters (light sources together with optical modulators), and multiplexers. In a repeater, the signal for each channel is recovered electronically and transmitted anew. Unfortunately, the complexity and cost of repeater-based systems becomes unwieldy with increase in the number of channels of WDM systems. Optical amplifier systems have therefore become attractive alternatives to repeaters. Erbium-doped fiber amplifier (EDFA) systems have become especially popular owing to their gain characteristics near the 1.5 μm (micrometer) transmission band of conventional optical fiber.

EDFA systems are generally associated with sets of set of so-called "optical passive components" which perform various signal and laser pump beam combination, separation, and re-direction functions. Also included in the set of optical passive components are optical isolators, generally one disposed to either side of the optical gain element (Er-doped fiber), which guard against amplification and subsequent transmission of backward-propagating signals. An example of a conventional EDFA system 100 including the various optical passive components is shown in FIG. 1. More particularly, FIG. 1 shows an amplifier of the prior art, which includes a basic EDFA block diagram. The EDFA system 100 shown in FIG. 1 is a unidirectional amplifier.

In FIG. 1, optical isolators, such as isolator 101 and isolator 102, are disposed to either side of an Er-doped fiber 103. At least one pump laser, such as co-pump laser 104 and/or counter-pump laser 105, are generally required to generate the fluorescence in the Er-doped fiber 103, which leads to amplification. These pump lasers 104, 105 generally have wavelengths of 980 or 1480 nm whereas the signal(s) has a wavelength near 1500 nm. Generally, at least two lasers are used such that one laser-the co-pump laser 104-directs its light along the Er-doped fiber 103 in the same direction as signal propagation and the other laser-the counter-pump laser 105-directs its light in the direction opposite to signal propagation.

Because of the differences in wavelengths between signal(s) and laser(s), wavelength-division multiplexers/demultiplexers (WDM's) such as input WDM 106 and output WDM 107 are required. Input WDM 106 combines the co-pump laser light together with the signal light such that both propagate in the same direction through the Er-doped fiber 103. Likewise, output WDM 107 combines the counter-pump laser light together with the signal light such that the two lights propagate in opposite directions through the Er-doped fiber 103. Furthermore, input WDM 106 and output WDM 107 remove any residual counter-pump light or co-pump light, respectively, from the system.

Other optical passive components, such as bandpass filter or isolator 108A and bandpass filter or isolator 108B, may be present to prevent laser light of the opposite laser from entering each respective pump laser. Finally, signal taps, such as input tap 109 and output tap 110, may be present so as to sample small proportions of the input and output signals, respectively. These samples of input and output signals may be directed to separate respective photo-detectors such as photo-detector 111A and photo-detector 111B so as to monitor the amplifier system performance using comparison and control logic 112.

Bi-directional lightwave communications systems are those in which signal lights are carried in both directions within individual optical fibers. In the current state of the art, separate amplifiers are used for eastbound (northbound) and westbound (southbound) communications channels as shown in the prior art band bi-directional amplifier 200 shown in FIG. 2. The counter-propagating signals are respectively separated and recombined on either side of the pair of optical amplifiers.

For instance, in FIG. 2, if the "blue" or relatively short wavelength band 201 shown as solid lines represents westward propagating signals and the "red" or relatively long wavelength band 202 shown as dash-dot lines represents eastward propagating signals, then these two signals are separated and recombined by WDMs 203A and 203B. Between the two WDMs 203A, 203B, the blue and red signals propagate on separate physical optical fiber sub-paths 204 and 205, respectively, but to either side of each WDM, the westbound blue and eastbound red signals co-propagate along the same physical fiber pathways 211 and 212. Each of the fiber sub-paths 204 and 205 contains its own amplifier system, 206 and 207, respectively.

Optional second amplifiers 208 and 209 may be placed in each of the fiber sub-paths and the locations between each of the resulting sequential amplifiers 206 and 208 or 207 and 209 corresponds to mid-stage access ports 210A and 210B in the blue and red sub-paths, respectively. Generally, each of the optical amplifier systems, 206 and 207 and, optionally, 208 and 209, shown in FIG. 2, comprises all the basic components illustrated in FIG. 1 and possibly others. In particular, the amplifier 206 (and optionally 208) contains optical isolators that only permit westward light propagation and the amplifier 207 (and optionally 209) contains optical isolators that only permit eastward light propagation.

One example of the wavelength constitution of co-propagating bi-directional signals is illustrated in FIG. 3, which corresponds to a band bi-directional amplifier. In FIG. 3, as an example, the "blue" band 301 and the "red" band 302 occupy separate wavelength regions each wholly contained within the well-known fiber transmission band 303 centered near a wavelength of 1.55 $\mu$m. For instance band 301 might represent the wavelength constitution of the westbound signal channel(s) 201 of FIG. 2 while band 302 might represent the wavelength constitution of the eastbound signal channel(s) 202. This type of bi-directional lightwave transmission scheme is termed "band bi-directional" transmission herein. Other types of band bi-directional transmission schemes are possible. For instance, the "blue" band might correspond to all or a portion of the 1.3 $\mu$m fiber transmission band while the "red" band might correspond to all or a portion of the 1.55 $\mu$m transmission band, etc.

Optical amplifiers are costly and complex components of optical data and telecommunications systems. The prior-art bi-directional optical amplification system shown in FIG. 2 uses two such amplifiers, effectively doubling the cost, complexity, and bulk relative to unidirectional transmission systems. This doubling of systems is necessitated by the fact that optical isolators, which are integral passive components of optical amplifiers, generally perform isolation in a unidirectional sense, regardless of the wavelength of light propagated through them.

SUMMARY OF THE INVENTION

Accordingly, it is an object of the present invention to create such advantages, as described herein, over the prior art through the disclosure of a set of optical passive components that together comprise a bi-directional amplifier.

An object of the present invention is to provide a bi-directional optical amplification system of reduced complexity, cost, and bulk relative to prior art bi-directional amplification systems.

Another object of the present invention is to provide a bi-directional optical transmission system which includes a bi-directional optical amplifier.

A further object of the present invention is to provide a bi-directional optical transmission system providing selective, bi-directional isolation of optical signals.

Yet another object of the present invention is to provide a bi-directional polarization independent optical isolator simultaneously transmitting at least two separate signal rays in opposite forward directions while simultaneously suppressing backward transmission of each signal ray in its respective reverse direction, and a corresponding method thereof.

Still another object of the present invention is to provide a method of asymmetric interleaved bi-directional wavelength multiplexed optical signal propagation in a light wave communications system, wherein a first set of channels included within a first set of bands propagates in a first direction, a second set of channels included within a second set of bands propagates in a second direction opposite to the first direction, the width of bands of the first set of bands is not equal to the width of bands of the second set of bands, and the first and second bands are interleaved with one another.

To accomplish those objects, the present invention is a bi-directional polarization independent optical amplifier system simultaneously transmitting two separate signal rays in opposite forward directions while simultaneously suppressing backward transmission of each of the two separate signal rays in its respective reverse direction. The bi-directional polarization independent optical amplifier system of the present invention comprises a bi-directional polarization independent optical isolator of the present invention. The bi-directional polarization independent isolator of the present invention comprises a birefringent polarization element, a reciprocal rotation element, a non-reciprocal rotation element, a reflective element, and a lens.

The birefringent polarization element separates each of the two separate signal rays into components thereof upon a first traverse therethrough and selectively re-combines the components of the two separate signal rays into two respective output signal rays upon a second traverse therethrough. The reciprocal optical rotation element and the non-reciprocal optical rotation element together selectively rotate the direction of the plane of polarization of both of the components of each of the two separate signal rays depending upon the transmission direction of the each of the two signal rays. The reflective element reflects the components of each of the two separate signal rays and selectively rotates both of the components of one of the two separate signal rays. The lens collimates and directs the components of the two separate signal rays traveling in a forward direction onto the reflective element, and focuses the reflected components onto the birefringent polarization element.

The two separate signal rays are separated from each other based upon their respective wavelengths.

More particularly, the two separate signal rays are separated into two, respective and separate wavelength bands.

Alternatively, the two separate signal rays include two sets of wavelengths, each of the two sets of wavelengths including a plurality of wavelengths, such that wavelengths of the two signal rays are alternatingly interspersed with each other.

In addition, the present invention is a method of bi-directional optical amplification of signal rays within an optical communications system. The method of the present invention comprises simultaneously inputting into a bi-directional polarization independent optical isolator of the present invention of the optical communications system two separate signal rays of the optical communications system. The bi-directional polarization independent optical isolator of the present invention causes simultaneous transmission of the two separate signal rays in opposite forward directions through an optical gain element and simultaneously suppresses backward transmission of each of the two separate signal rays in its respective reverse direction.

Moreover, the present invention includes a method of asymmetric interleaved bi-directional wavelength multiplexed optical signal propagation in a light wave communications system, in which a first set of channels included within a first set of bands propagates in a first direction and a second set of channels included within a second set of bands propagates in a second direction opposite to the first direction, the width of bands of the first set of bands is not equal to the width of bands of the second set of bands, and the first and second bands are interleaved with one another.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The objects and features of the present invention will become more readily apparent from the following detailed description taken in conjunction with the accompanying drawings in which:

FIGS. 9A through 9D are end views of the fiber (port) configuration within both the front and rear ferrules of both the East and West passive component sets of a bi-directional amplifier system in accordance with the present invention.

DESCRIPTION OF THE PREFERRED EMBODIMENTS

Figure 1:
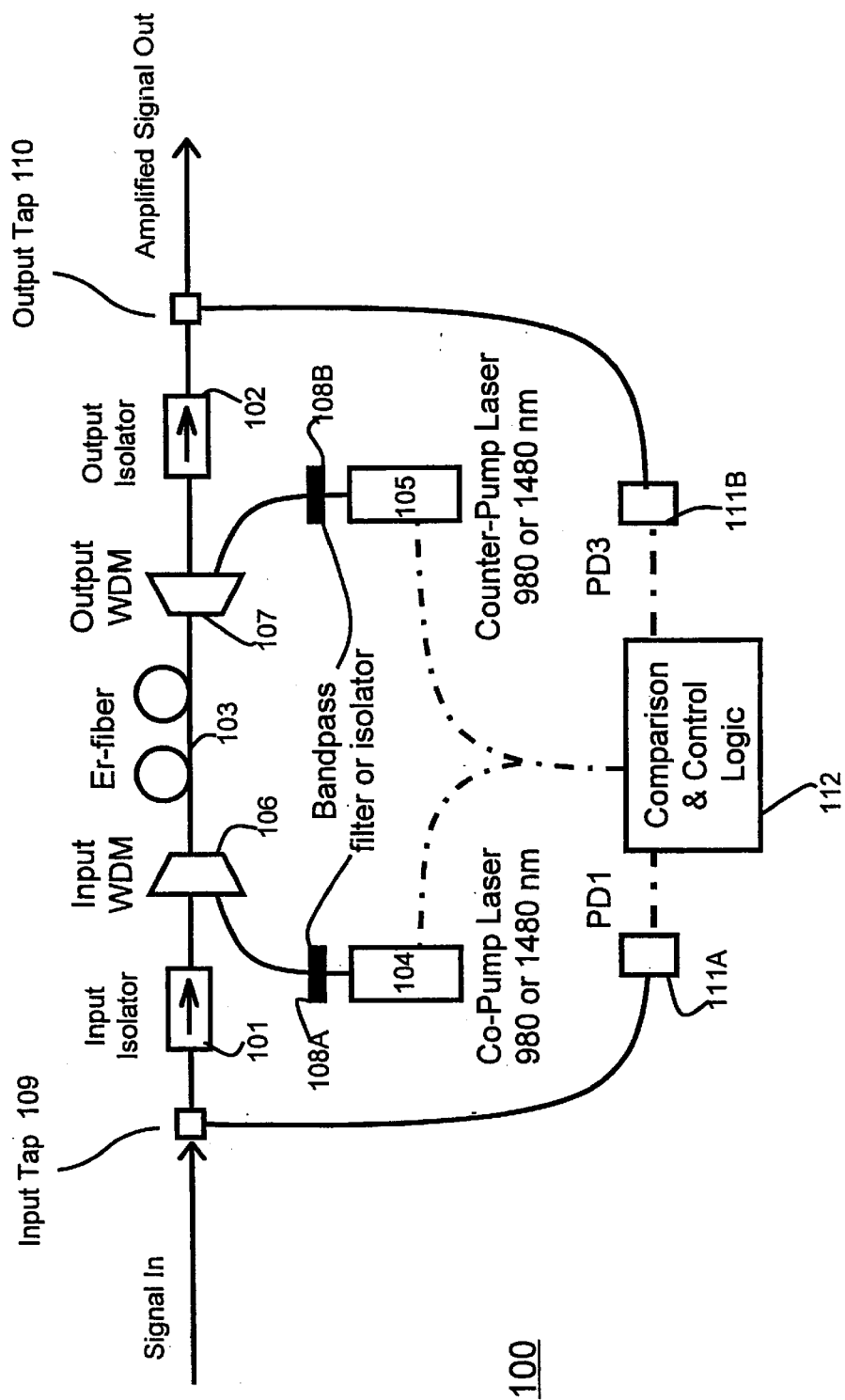
FIG. 1 is a basic block diagram of an optical fiber amplifier showing the assembly of conventional optical passive components.

In the description of the present invention, it is to be noted that like parts are designated by like reference numerals throughout in the accompanying drawings.

Figure 4A:
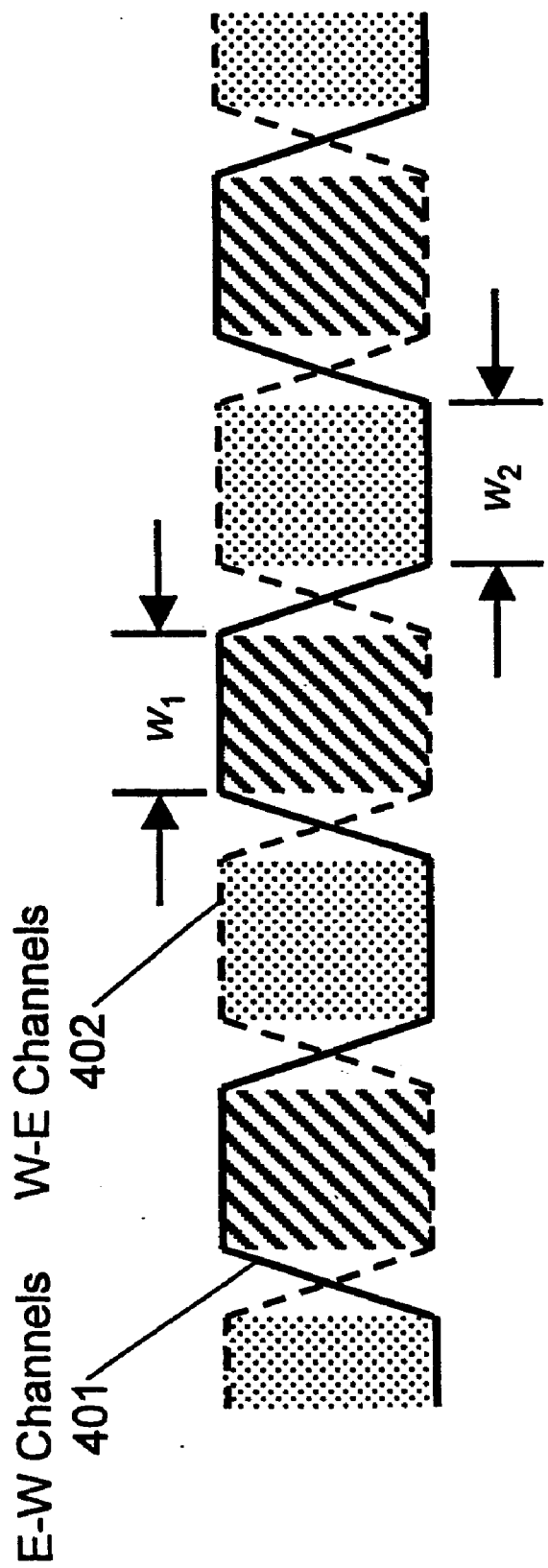
FIGS. 4A–C are schematic illustrations of configurations of optical transmission bands in symmetrically and asymmetrically interleaved wavelength-division multiplexed bi-directional lightwave transmission systems.
Figure 4B:
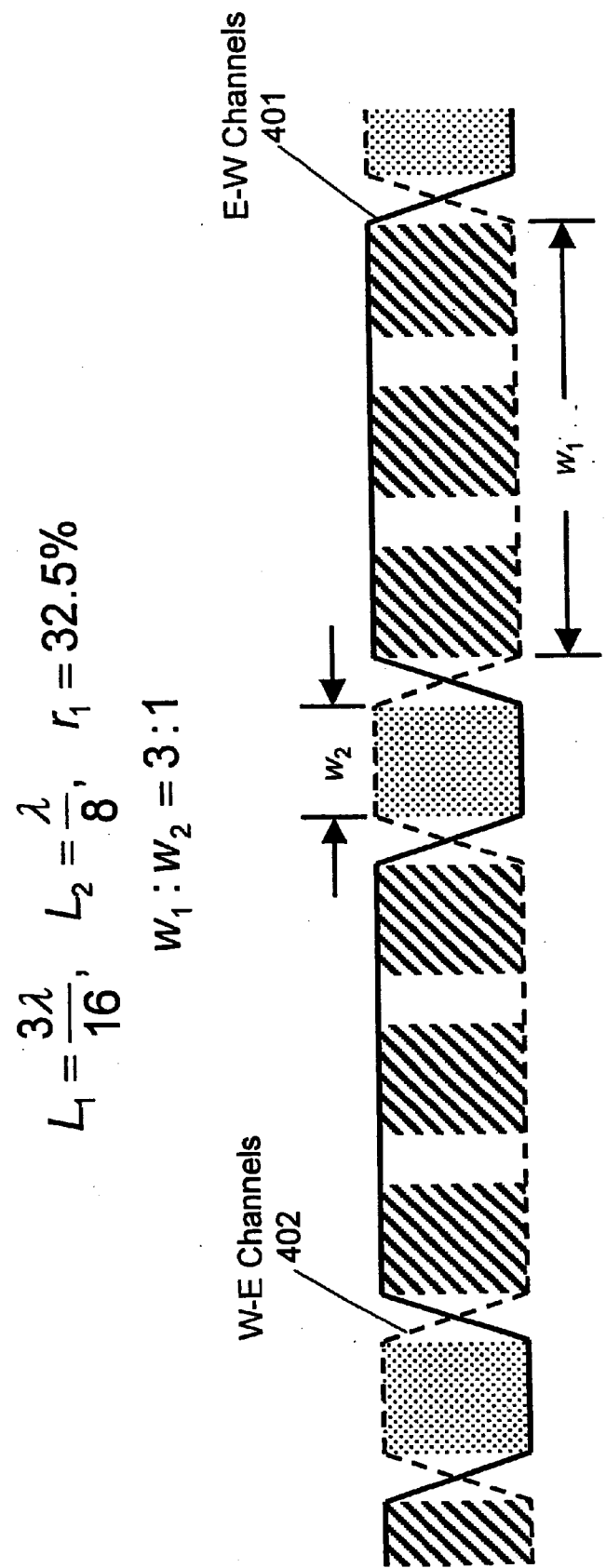
Figure 4C:
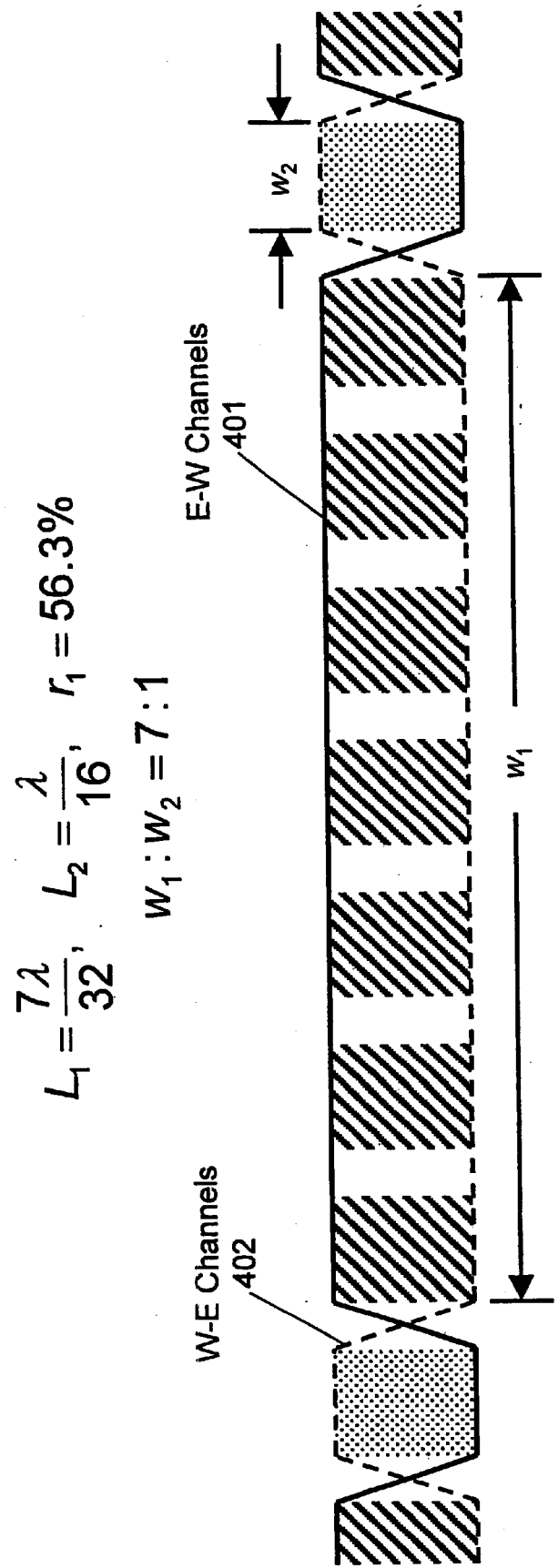
Figure 5A:
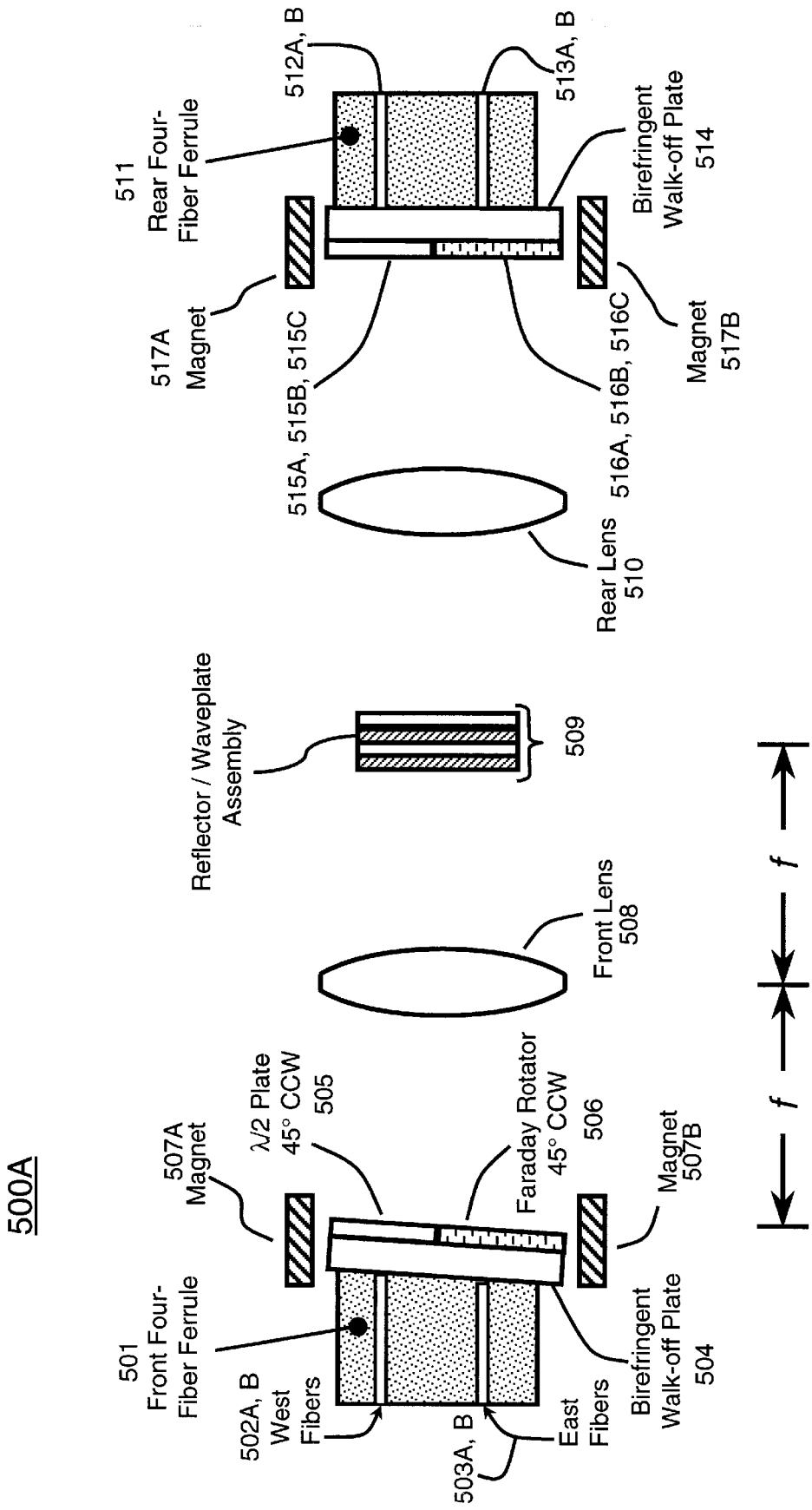
FIG. 5A and 5B are side views of two embodiments of an integrated set of optical passive components comprising a band bi-directional and interleaved bi-directional amplifier system, respectively, according to the present invention.
Figure 5B:
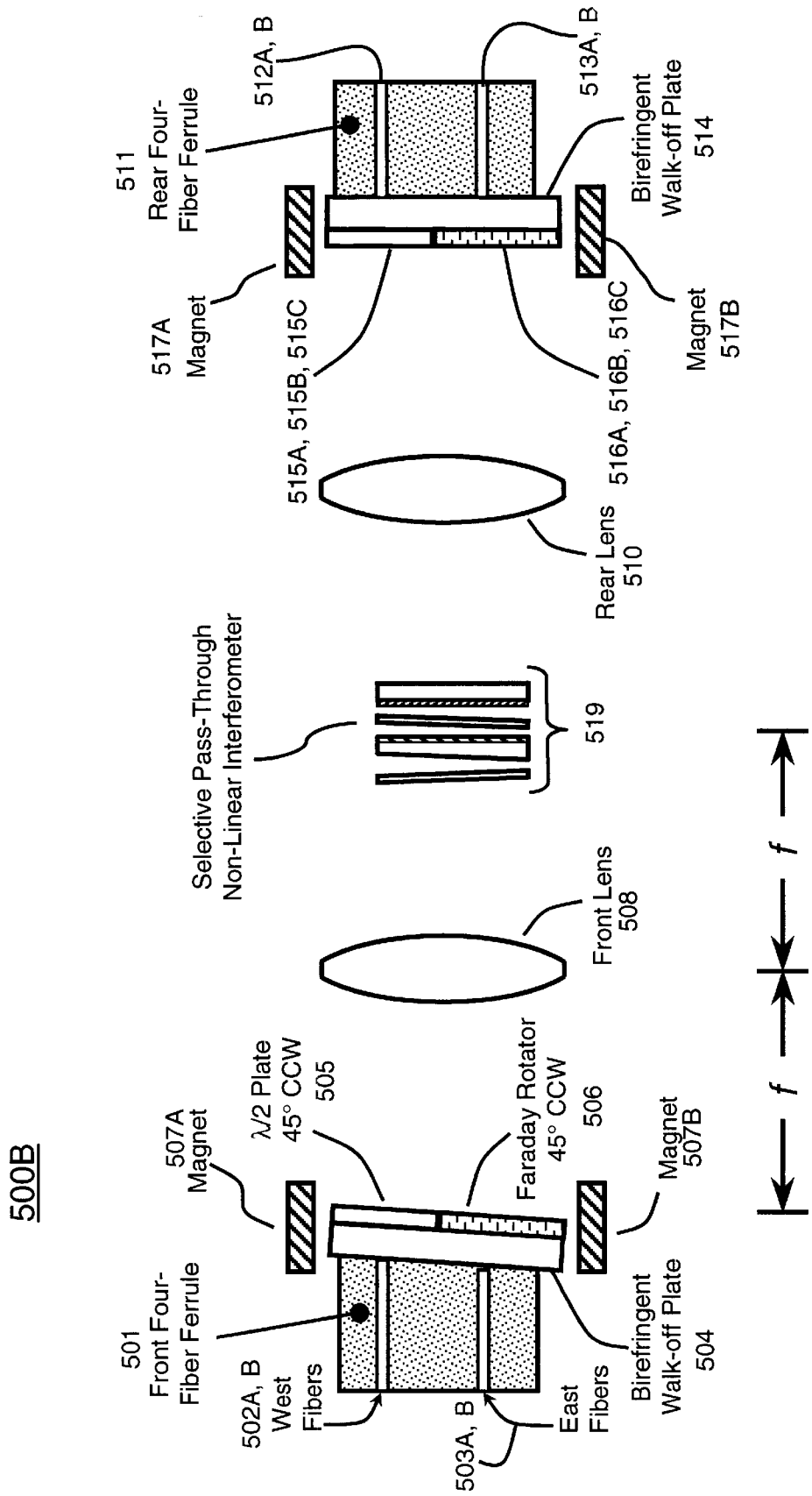

Before the preferred embodiments of the present invention are described beginning with reference to FIGS. 5A and 5B, a brief description of interleaved bi-directional transmission is presented with reference to FIGS. 4A–4C.

FIGS. 4A–4C illustrate a more complex form of bi-directional transmission, herein termed "interleaved bi-directional" transmission, which occurs in an interleaved bi-directional amplifier. In interleaved bi-directional transmission, one set of channels propagates in one direction along an optical fiber while the remaining set of channels propagates in the other direction, wherein the first and second sets are interleaved with each other. For instance, in FIG. 4A, the even-numbered or first set of channels 401 denoted by darkly shaded rectangles outlined by solid lines, for example, might comprise the westbound channels, whereas the odd-numbered or second set of channels 402 denoted by lightly shaded rectangles outlined by dashed lines, for example, might comprise the eastbound channels. The aforementioned solid and dashed lines schematically represent the optical pass bands and isolation bands for the first and second channel sets, respectively.

FIG. 4A illustrates symmetric interleaving of wavelength division multiplexed channels, wherein the pass bands of the first set 401 of channels comprise a band width, $w_1$, the pass bands of the second set 402 of channels comprise a band width $w_2$ substantially equal to $w_1$, and channels of the first set and the second set are interleaved or alternate with one another. FIGS. 4B and 4C schematically illustrate two examples of asymmetric interleaving of wavelength division multiplexed channels, wherein the two band widths of the two channel sets, $w_1$ and $w_2$, are not identical to one another and the pass bands of one (or the other) of the interleaved sets may comprise more than one channel. Shaded rectangles in each of FIGS. 4A and 4B schematically illustrate the widths and positions of conventional wavelength division multiplexed channels. Thus, as shown in FIG. 4B, each of the pass bands of the first set 401 and second set 402 of channels encompasses or comprises three conventional channels and a single conventional channel, respectively. In FIG. 4C, each of the pass bands of the first set 401 and second set 402 of channels encompasses or comprises seven conventional channels and a single conventional channel, respectively.

Each pass band of either channel set may comprise multiple conventional channels, as shown in FIGS. 4B and 4C, or else may comprise a single channel of non-conventional band width. In either symmetric or asymmetric interleaving, pass bands of the first and second channel sets are interleaved with one another and one channel set propagates in a first direction and the other channel set propagates in a second direction opposite to the first direction. Such symmetric and asymmetric wavelength division channel interleaving, as illustrated in FIGS. 4A–C are disclosed in a co-pending U.S. Patent Application titled Dense Wavelength Division Multiplexer Utilizing An Asymmetric Pass Band Interferometer, which is incorporated herein by reference.

Figure 2:
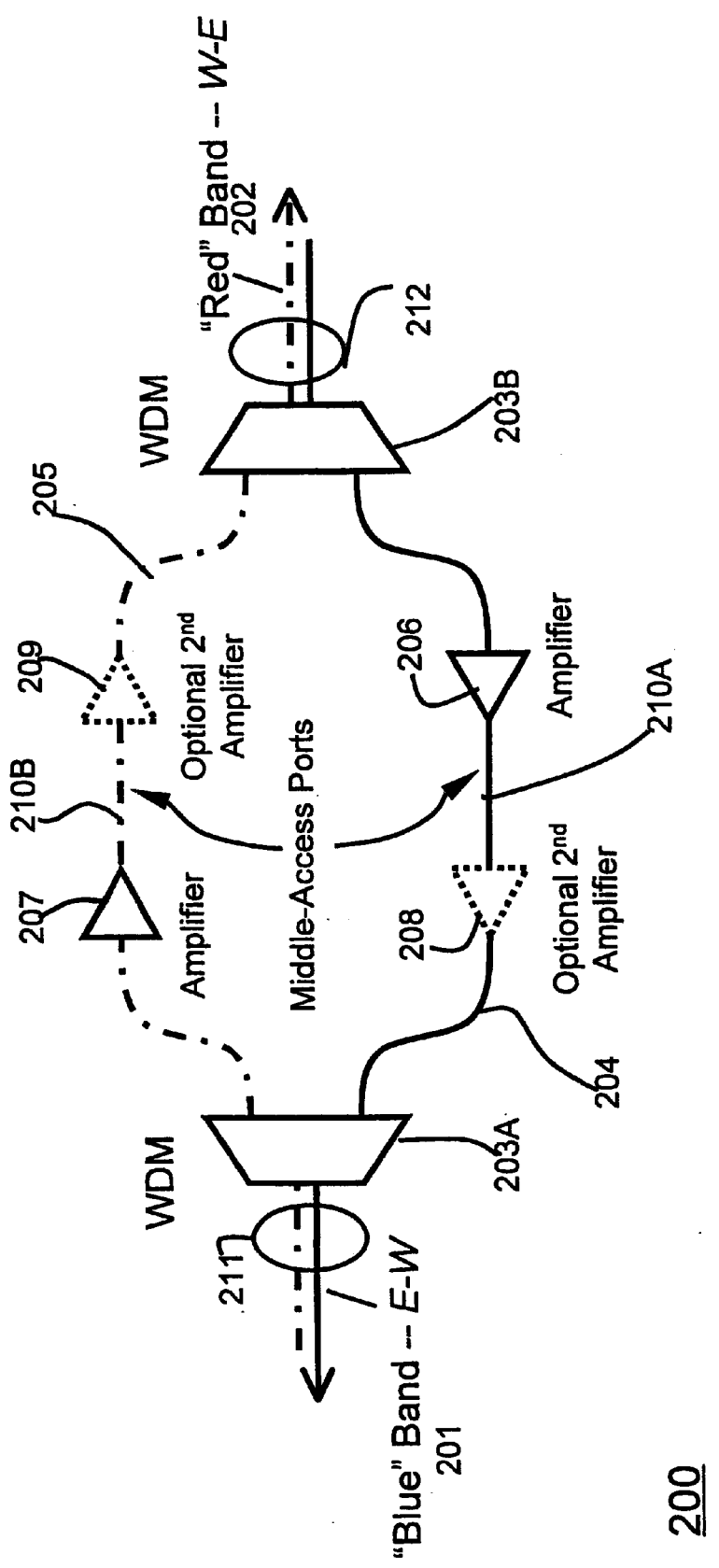
FIG. 2 is a basic block diagram of a prior-art system of optical amplifiers utilized for separate amplification of component sub-signals of a bi-directional optical transmission system.
Figure 3:
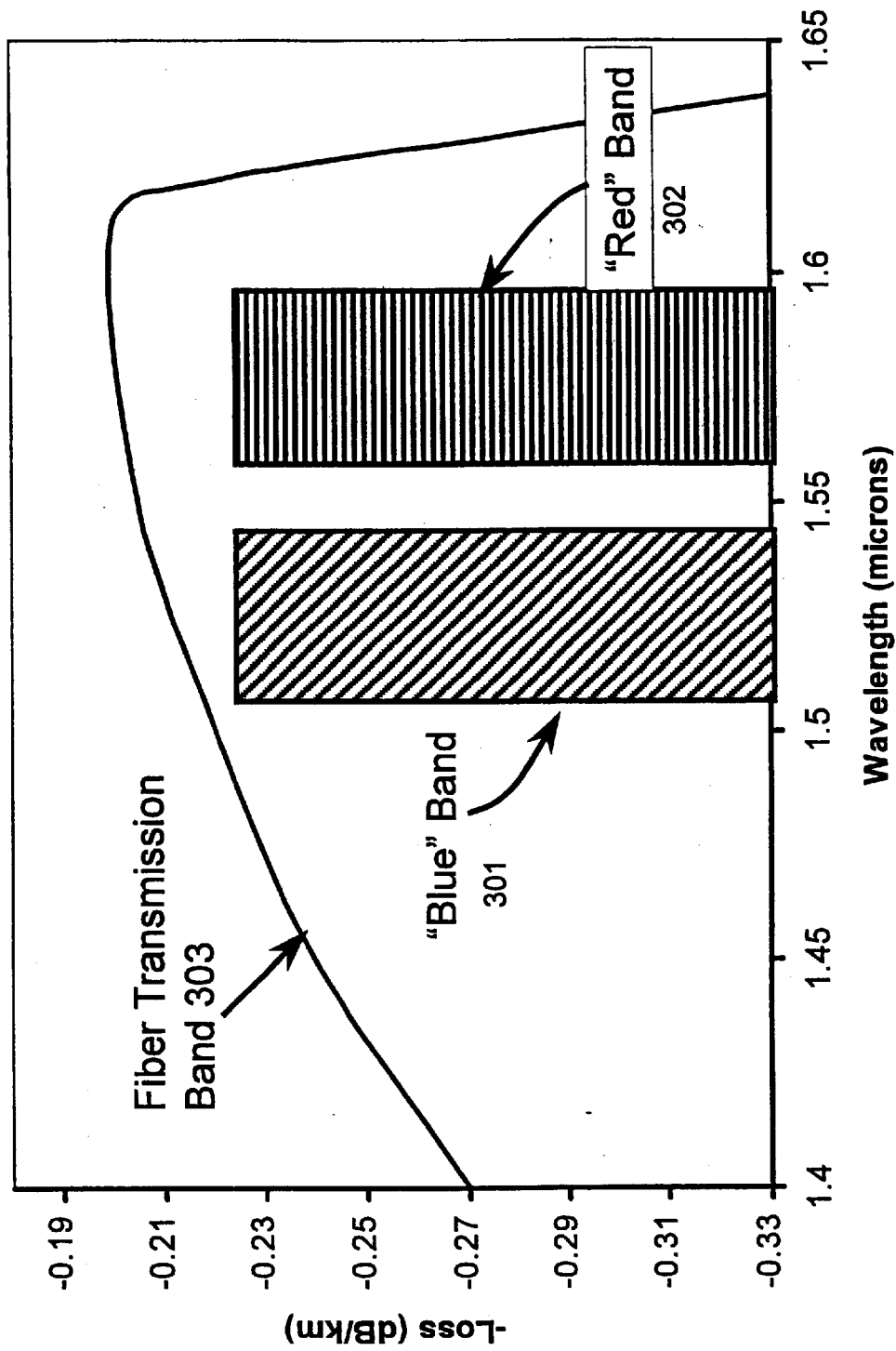
FIG. 3 is a schematic graph of an arrangement of wavelength constitution of optical transmission bands in a band-bi-directional lightwave transmission system.

Functionally, the set of channels 401 corresponds to the blue channel 301 of FIG. 3 and the westbound signal 201 of FIG. 2 while the set of channels 402 corresponds to the red channel 302 and the eastbound signal 202.

Moreover, and as discussed herein above, a problem with the prior art bi-directional optical amplification system shown in FIG. 2 is that a doubling of the number of components, particularly the costly and complex optical amplifiers, over that of unidirectional optical systems is required. To overcome this problem of prior-art optical isolators, a bi-directional polarization independent optical isolator is disclosed in the above-mentioned co-pending U.S. Patent Application entitled Bi-Directional Polarization-Independent Optical Isolator. These bi-directional polarization independent optical isolators have the property such that the direction in which isolation occurs depends upon wavelength. Clearly, the incorporation of such bi-directional optical isolators into an optical amplifier system would obviate the need for two amplifiers in bi-directional photonic systems and would facilitate the development of a bi-directional amplifier. Such a development would have the advantage of reduced cost, bulk, and complexity as compared to existing bi-directional optical amplification systems and would have the additional advantage of facilitating the incorporation of bi-directional amplification into existing fiber-optic cable.

The present invention is a bi-directional optical amplifier system including the above-mentioned bi-directional polarization independent optical isolators.

Two embodiments of the present invention, each of which comprises an integrated set of optical components for use in a bi-directional optical amplifier system, are shown in FIGS. 5A and 5B, respectively. A first embodiment of the present invention is shown in FIG. 5A, and a second embodiment of the present invention is shown in FIG. 5B.

FIG. 5A shows a side view of an integrated set of optical components comprising a bi-directional amplifier system 500A of the present invention suitable for use in a band bi-directional amplifier system. More particularly, FIG. 5A shows a band bi-directional amplifier 500A of the present invention for use in a band bi-directional system.

FIG. 5B is a side view of an embodiment of the present invention 500B suitable for use in an interleaved bi-directional amplifier system. More particularly, FIG. 5B shows an interleaved bi-directional amplifier 500B of the present invention for use in an interleaved bi-directional system.

In FIG. 5A, reference numeral 501 is a front four-fiber holder or ferrule. Contained within and secured to or by front ferrule 501 are two sets of fibers 502A and 502B and 503A and 503B, respectively. Fibers 502A and 502B are on the logical west side of the device whereas fibers 503A and 503B are on the logical east side of the device. The end faces of the front ferrule and fibers contained therein are cut at an angle of approximately 8° to prevent backward propagation of reflected light and are polished flat. Also, in FIG. 5A, reference numeral 504 is a birefringent walk-off plate, and reference numerals 505 and 506 are a $\lambda/2$ (half-wave) plate and Faraday rotator, respectively, which rotate the polarization planes of linearly polarized light passing therethrough by 45° counter-clockwise (CCW) in a reversible and non-reversible fashion, respectively. Magnets 507A and 507B (FIG. 5A) provide the magnetic field under which the magneto-optic effect of Faraday rotator 506 is actuated. The system 500A also contains a front focusing lens 508, a reflector/waveplate assembly 509 and a rear focusing lens 510 disposed in this order. Also shown in FIG. 5A, at the end of device 500A opposite to the front four-fiber ferrule 501, is a second identical rear four fiber ferrule 511. The rear four-fiber ferrule 511 contains, in a fashion similar to the assembly of front ferrule 501, four additional rear fibers 512A, 512B, 513A, and 513B. The ferrule 511 is aligned such that the four fibers 512A, 512B, 513A and 513B are directly opposite to fibers 502A, 502B, 503A and 503B, respectively. The end faces of rear ferrule 511 and the fibers contained therein are cut flat and polished and face in a direction towards the front ferrule 501. Disposed adjacent to the end face of rear ferrule 511 and the fibers contained therein, in the direction facing front ferrule 501, is a second birefringent walk-off plate 514 which is of similar material and thickness to front birefringent plate 504 and which is aligned such that its optic axis is approximately symmetrically disposed about a vertical plane with respect to the optic axis of birefringent element 504. Disposed adjacent to birefringent element 514, in the direction facing front ferrule 501 are a pair of rear half-wave plates 515A and 516A or 515B and 515C and a rear Faraday Rotator 516B or 516C. The two rear half-wave plates 515A and 516A or 515B and 515C and the rear Faraday Rotator 516B or 516C have optical properties such that they rotate the polarization planes of linearly polarized light passing therethrough by 45° in a reversible and non-reversible fashion, respectively. Magnets 517A and 517B (FIG. 5A) provide the magnetic field under which the magneto-optic effect of Faraday rotator 516B or 516C is actuated. The exact positions and rotation directions, either clockwise (CW) or counterclockwise (CCW), of the rear half-wave plates and the rotation direction of the rear Faraday rotator are illustrated in detail in FIG. 9B and FIG. 9D and depend upon the usage of the bi-directional amplifier system 500A or 500B as either a logical East device or a logical West device, as described in more detail herein following.

Figure 6:
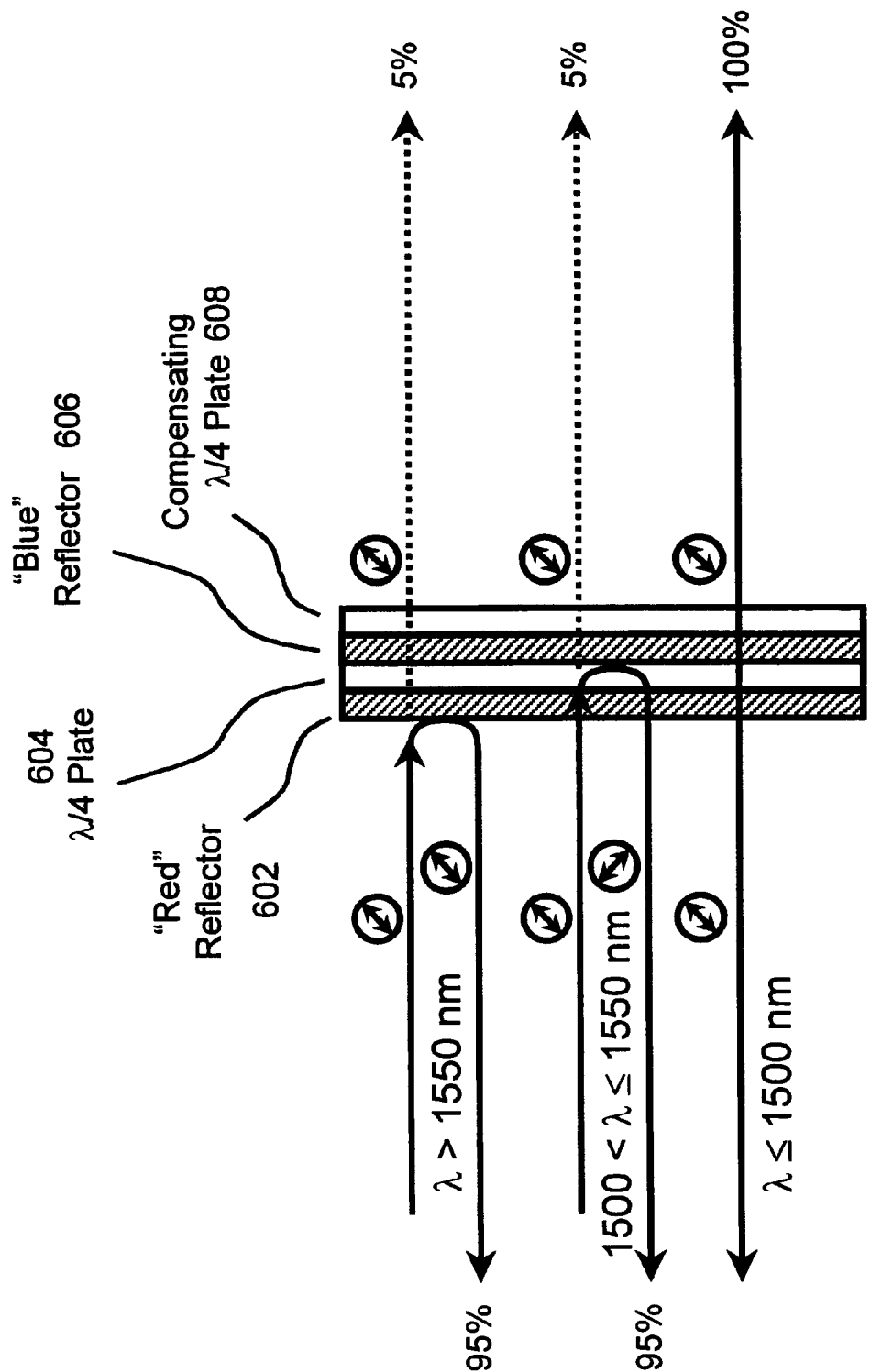
FIG. 6 is a side view of the central mirror and waveplate assembly of an integrated set of optical components for a band bi-directional amplifier system showing ray paths therethrough.
Figure 7:
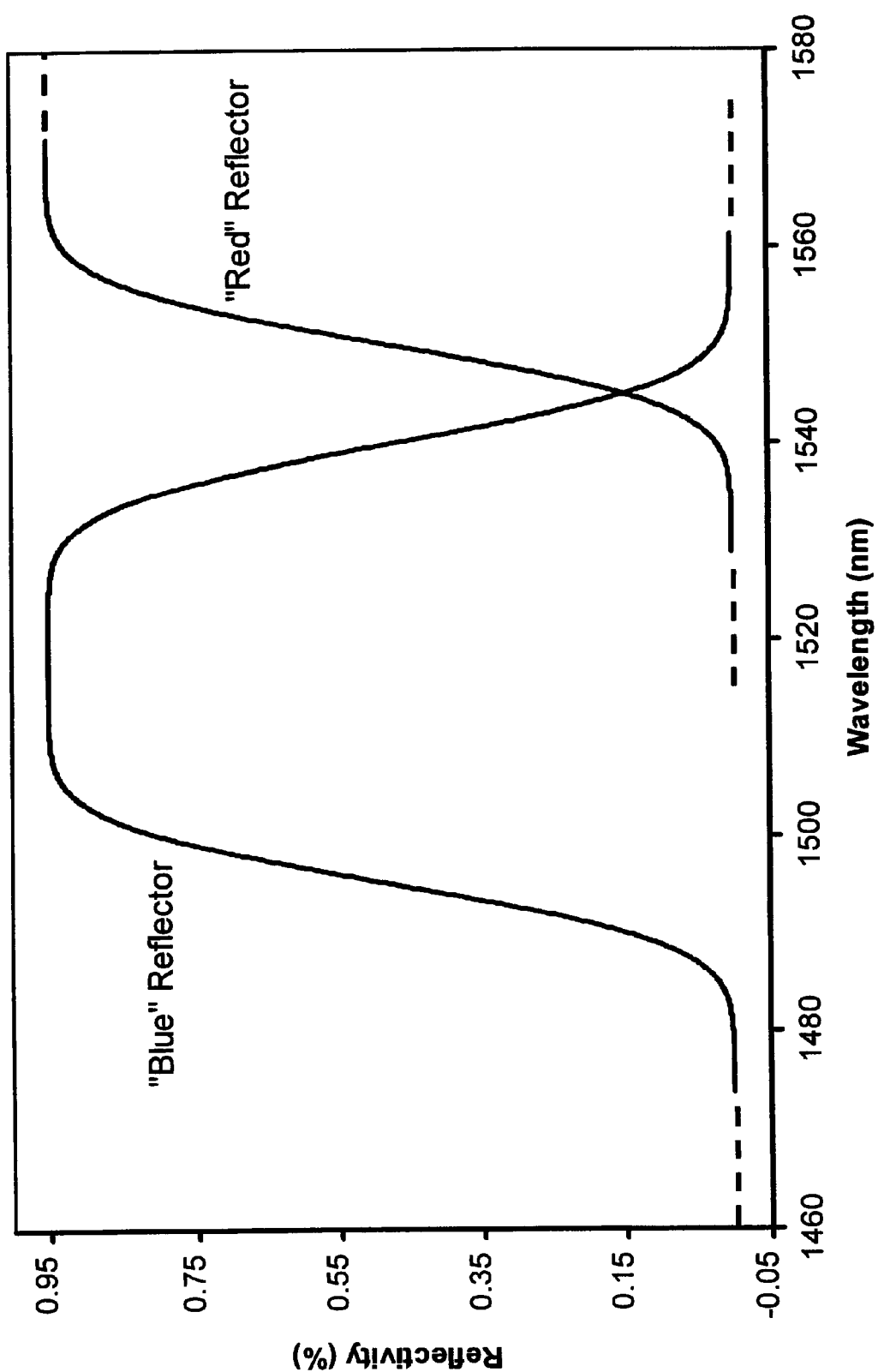
FIG. 7 is a graph of the preferred reflectivity curves, in reflectivity against wavelength, for the two reflective elements of a single-stage band bi-directional optical isolator in a bi-directional amplifier system.
Figure 8:
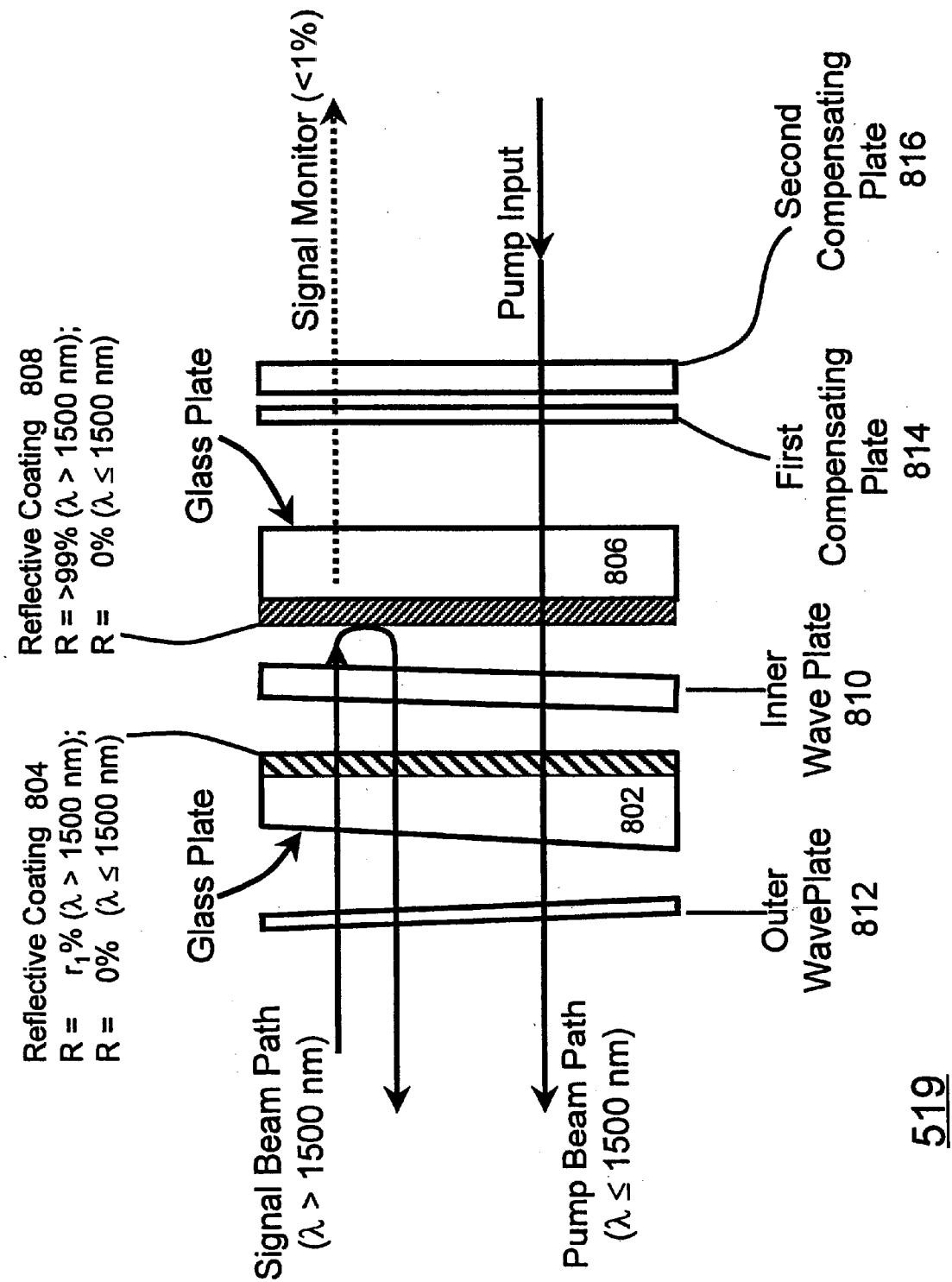
FIG. 8 is a side view of a non-linear interferometer for use in the optical passive components of the interleaved bi-directional amplifier of the present invention showing the paths of signal light and laser pump light.

FIG. 5B is a side view of an embodiment of the present invention 500B suitable for use in an interleaved bi-directional amplifier system. All components in system 500B are identical and in similar locations to those in system 500A except for the replacement of reflector/waveplate assembly 509 by a new element, selective pass through non-linear interferometer 519. The details of the construction and optical properties of reflector/waveplate assembly 509 of the bi-directional amplifier system 500A are shown in FIG. 6 and FIG. 7. The details of the construction and optical properties of the selective pass-through non-linear interferometer assembly 519 of bi-directional amplifier system 500B are shown in FIG. 8.

As described in greater detail below, both assembly 509 and 519 have the property that, upon reflection therefrom, they rotate the direction of the polarization plane of one signal channel or set of signal channels by 90° while maintaining constant the polarization plane direction of the other channel or set of channels. In assembly 509 (FIG. 5A), the polarization plane directions of the shorter wavelength (or "blue") channel or set of channels is rotated by 90° around the propagation axis whereas the polarization plane direction of the longer wavelength (or "red") channel or set of channels is not rotated. Likewise, in assembly 519 (FIG. 5B), the polarization plane directions of every second (or "even") channel is rotated by 90° around the propagation axis whereas the polarization plane direction of the remaining (or "odd") channel or set of channels is not rotated. As discussed in greater detail below, through these respective properties, the assembly 509 enables the system 500A to be used as a band bi-directional set of optical passive components and the assembly 519 enables the system 500B to be used as an interleaved bi-directional set of optical passive components.

The mirror/waveplate assembly 509 included in the bi-directional amplifier system 500A is shown in side view in FIG. 6. The assembly 509 includes four elements—a red reflector (mirror) 602, a first λ/4 (quarter-wave) plate 604, a blue reflector (mirror) 606 and a second compensating λ/4 plate 608 all disposed in this order in the direction away from the front lens 508. Also, the optical axes of the first λ/4 plate 604 and the second λ/4 plate 608 are each disposed in a plane perpendicular to the direction of light propagation therethrough, at right angles to one another, and at a 45° angle relative to the polarization plane orientations of sub-signal lights passing therethrough.

FIG. 7 shows idealized mirror reflectivity curves for a reflector/waveplate assembly in a bi-directional amplifier system of the present invention. More particularly, FIG. 7 shows examples of idealized mirror reflectivity curves of the preferred variation of reflectivity against wavelength for the "blue" reflector 606 and the "red" reflector 602, respectively, of the reflector/waveplate assembly 509 of the bi-directional amplifier system 500A, under the assumption that the "red" band and "blue" band as discussed above are as defined in FIG. 3. It is also assumed that all light that is not reflected by a given reflector is transmitted therethrough although, in practice, a small percentage of light will be absorbed therein. The reflectivity of the red reflector 602 is chosen so as to reflect and transmit preferably approximately 95% and approximately 5%, respectively, of the light signal in the red band while transmitting preferably 100% of light of shorter wavelengths. Likewise, the reflectivity of the blue reflector 606 is chosen so as to reflect and transmit preferably approximately 95% and approximately 5%, respectively, of the light signal in the blue band while transmitting preferably 100% of light of shorter and longer wavelengths.

Although the reflectivity of the blue reflector 606 and of the red reflector 602 are illustrated, respectively, by specific curves in FIG. 7, one of ordinary skill in the art will readily recognize that, without departing from the scope or spirit of the present invention, the wavelength definitions of the red and of the blue bands may be chosen differently, and that for such alternate definitions, the reflectivity curves of the two reflectors may need to be varied from those shown in FIG. 7, as appropriate. Furthermore, the relative physical positions of the red and blue reflectors may be interchanged and simultaneous associated changes of the reflectivity curves and/or band propagation directions may be made without changing the basic functionality or the spirit or scope of the present invention.

The reflected and transmitted portions of light of various wavelengths during interaction with reflector/waveplate 509 are shown in FIG. 6 together with their linear polarization directions. Because of the chosen reflectivities of reflectors 602 and 606, substantially 100% of the light of wavelengths shorter than the blue band passes completely through the reflector/waveplate assembly 509. Furthermore, approximately 95% of the signal light in the red band does not pass through the first λ/4 plate 604, the blue reflector 606 or the second λ/4 plate 608. Furthermore, approximately 95% of the light in the blue band passes through the red reflector 602 and the first λ/4 plate 604 twice—once before and once after reflection off the blue reflector 606—but does not pass through the second λ/4 plate. Furthermore, a proportion equivalent to approximately 5% of the signal light comprising the red band and also comprising the blue band passes completely through all four elements comprising the reflector/waveplate assembly 509.

As shown in FIG. 6, the approximately 95% of the light comprising the red band that is reflected by red reflector 602 does not experience a change in the direction of its polarization. Furthermore, the approximately 95% of the light comprising the blue band that is reflected by blue reflector 606 experiences a 90° rotation of the direction of its polarization. This is because this reflected blue-band light passes twice through the first λ/4 plate 604 whose optical axes are disposed at a 45° angle relative to the incoming light polarization direction. The light that passes completely through the assembly 509—that is, pump laser light of wavelengths shorter than the blue band as well as approximately 5% proportions of the signal light of the red and blue bands that are transmitted through reflectors 602 and 606, respectively—does not experience any net rotation of the direction of its polarization plane. This is because all such light must pass through both the first λ/4 plate 604 as well as the second λ/4 608 plate and the optical axes of the first and second λ/4 plates are disposed at right angles to one another. Thus, the second λ/4 plate 608 exactly compensates any birefringent retardance imposed upon these transmitted lights by the first λ/4 plate 604.

FIG. 8 shows a selective pass-through non-linear interferometer assembly. More particularly, FIG. 8 is a side view of the selective pass-through non-linear interferometer 519 used in the second embodiment of the present invention, showing the paths of signal light and laser pump light. The non-linear interferometer 519 shown in FIG. 8 is a modified version of an invention disclosed in the above-mentioned co-pending U.S. Patent Application entitled Nonlinear Interferometer for Fiber Optic Dense Wavelength Division Multiplexer Utilizing a Phase Bias Element to Separate Wavelengths in an Optical Signal and in the above-mentioned co-pending U.S. Patent Application entitled Dense Wavelength Division Multiplexer Utilizing An Asymmetric Pass Band Interferometer. The non-linear interferometer 519 comprises a first (or front) glass plate 802 whose second (or rear) surface hosts a first partially reflective coating 804, a second (or rear) glass plate 806 whose first (or front) surface hosts a second partially reflective coating 808, an inner wave plate 810 between the two coated glass plates 802 and 806, an outer wave plate 812 adjacent to the front surface of glass plate 802, a first compensating wave plate 814 and a second compensating wave plate 816. The first compensating wave plate 814 and the second compensating wave plate 816 are disposed to the rear of second glass plate 806 and, in the example shown, are identical to outer wave plate 812 and to inner wave plate 810, respectively, except that the directions of the optic axes of first compensating wave plate 814 and second compensating wave plate 816 are at right angles to those of outer wave plate 812 and inner wave plate 810, respectively. The inner wave plate 810, outer wave plate 812, first compensating wave plate 814, and second compensating wave plate 816 comprise a birefringent optical material such as single-crystal quartz.

The selective pass-through non-linear interferometer 519 is modified from that disclosed in Dense Wavelength Division Multiplexer Utilizing An Asymmetric Pass Band Interferometer through incorporation of the two compensating wave plates. The first and second partially reflective coatings 804 and 808 have reflectivity values of $r_1$ and >99%, respectively, for wavelengths of light comprising signal bands and values of 0% for wavelengths of light shorter than those of the signal bands. Furthermore, the outer wave plate 812 and first compensating wave plate 814 both comprise a birefringent differential optical retardance value of $L_1$ (in units of length), and the inner wave plate 810 and second compensating wave plate 816 both comprise a birefringent differential optical retardance value of $L_2$.

Because of the reflectivity characteristics of second reflective coating 808, a proportion equivalent to >99% of any signal light ray entering non-linear interferometer 519 from the front side will be reflected as shown in FIG. 8. The remaining <1% proportion of said signal light ray as well as 100% of all light rays of wavelengths shorter than those comprising signals will pass completely through non-linear interferometer 519. The operation of the non-linear interferometer 519 is such that, of the reflected portion of the signal light, linearly polarized signal light having a wavelength corresponding to every one of a first set of bands (for instance, even-numbered bands) will be reflected with a 90° rotation of its plane of polarization whereas linearly polarized signal light of wavelengths corresponding to the remaining bands interleaved with the first set (for instance odd-numbered bands) will be reflected without change in polarization. The light that passes completely through the non-linear interferometer 519—that is, pump laser light of wavelengths shorter than the wavelengths of signal lights as well as the <1% proportions of the signal light that are transmitted through the partially reflective coating 808— does not experience any net rotation of the direction of its polarization plane. This is because all such light must pass through both the inner wave plate 810 and the second compensating wave plate 816 as well as through both the outer wave plate 812 and the first compensating wave plate 814.

The specific configuration of interleaved bands, as exemplified by FIGS. 4A–4C, is determined by the choice of the values of the parameters $L_1$, $L_2$ and $r_1$ associated with interferometer 519. For instance, to obtain the symmetrically interleaved configuration illustrated in FIG. 4A, in which one set of bands comprises odd channels and the other set comprises even channels, these three parameters are set at $\lambda/8$, $\lambda/4$, and 18.5%, respectively. To obtain the three-to-one and seven-to-one asymmetric interleaving configurations illustrated in FIGS. 4B–4C, these three parameters are set at $3\lambda/16$, $\lambda/8$, and 32.5% and $7\lambda/32$, $\lambda/16$ and 56.3%, respectively. Other choices of parameter sets lead to different interleaved band configurations than those illustrated in FIGS. 4A–C, and the invention is not intended to be limited to these three particular examples.

The first 814 and second 816 compensating wave plates in the selective pass-through non-linear interferometer 519 together compensate any changes in polarization of light transmitted completely through the elements 802–812. Since the thickness and material of the inner wave plate 810 is identical to that of the second compensating wave plate 816 wherein the optical axes of two said wave plates are disposed at right angles to one another and to the light propagation direction, then any birefringent differential optical retardance imposed upon lights transmitted through the inner wave plate 810 is exactly negated during subsequent transmission through the second compensating wave plate 816. Likewise, since the thickness and material of the outer wave plate 812 is identical to that of the first compensating wave plate 814 wherein the optical axes of two said wave plates are disposed at right angles to one another and to the light propagation direction, then any birefringent differential optical retardance imposed upon lights transmitted through the outer wave plate 812 is exactly negated during subsequent transmission through the first compensating wave plate 814. In this fashion, for any light transmitted completely through the selective pass-through non-linear interferometer 519, the polarization state of the light after such transmission is identical to that before the transmission (FIG. 8). One of ordinary skill in the art will, however, recognize that, without departing from the scope or spirit of the present invention, such polarization state compensation may be accomplished by different choices and arrangements of optical elements or that such compensation may even be neglected entirely, provided that accompanying changes are made in the optical elements disposed to the front of rear four-fiber ferrule 511.

In operation, each embodiment of the current invention is used in pairs, comprising both a logical East device and a logical West device. The two devices of each pair are disposed at alternate sides of a bi-directional amplifier system in accordance with the present invention. Furthermore, each device is a set of optical passive components in accordance with either embodiment of the current invention.

Figure 10A:
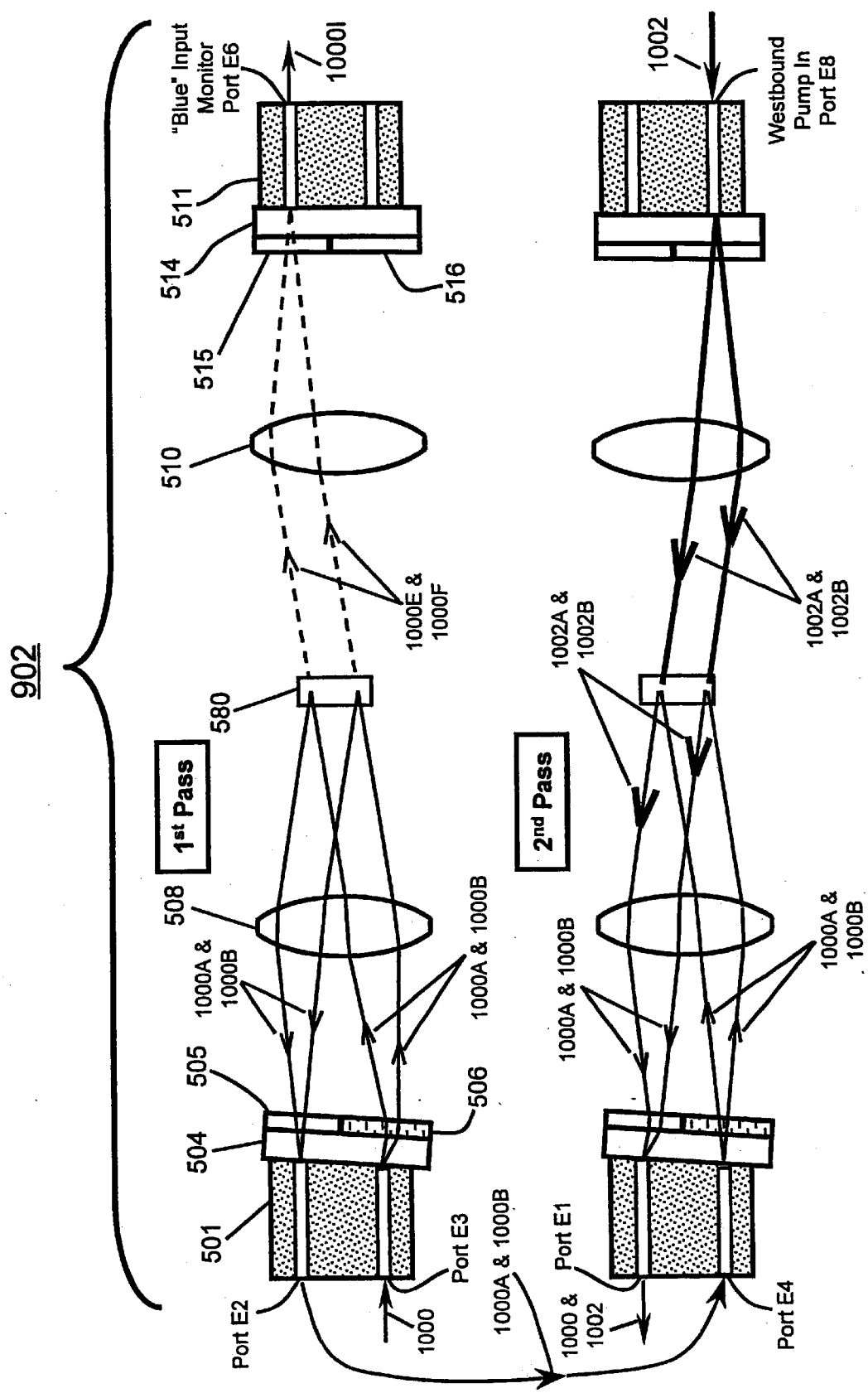
FIGS. 10A and 10B are side views of bounding ray paths of pump beams and of westbound light signals within the East and West set of optical passive components, respectively.

FIGS. 9A through 9D show an input/output port configuration of a bi-directional amplifier, and, more specifically, the input/output port configuration of the bi-directional amplifier shown beginning with FIG. 10A. More particularly, FIGS. 9A through 9D show end views of the fiber or port configuration associated with both the front and rear ferrules of both logical East passive component device 902 and a logical West passive component device 904. The configurations of the front ports are identical for both East and West devices 902 and 904. However, the configuration of the rear port varies depending upon whether the device is used on the logical East side or the logical West side of a bi-directional amplifier system.

As illustrated in FIG. 9A and FIG. 9C, the four fibers or ports associated with the front ferrule of either a logical East device or a logical West device themselves comprise two logical West fibers and two logical East fibers. As shown in FIG. 9A, the logical West ports (fibers) of the East device 902, Port E1 905 and Port E2 906, are disposed to one side of the interior of the front four fiber ferrule 501 and the logical East ports (fibers) of the East device 902, Port E3 907 and Port E4 908, are disposed to the other side of the interior of ferrule 501. As shown in FIG. 9C, the logical West ports (fibers) of the West device 904, Port W1 913 and Port W2 914, and the logical East ports (fibers) of the West device 904, Port W3 915 and Port W4 916, have dispositions similar to those in the East device 902. Also as shown in FIGS. 9A, 9C, 5A and 5B, a 45°-counterclockwise-rotating λ/2 plate 505 is disposed adjacent to the two logical West Ports, Port E1 905 and Port E2 906 or Port W1 913 and Port W2 914, in the direction of the rear lens 510. Also as shown in FIGS. 9A, 9C, 5A and 5B, a 45°-counterclockwise rotating Faraday rotator 506 is disposed adjacent to the two logical East Ports, Port E3 907 and Port E4 908 or Port W3 915 and Port W4 916, in the direction of the rear lens 510.

As also illustrated in FIG. 9B, the set of Ports (fibers) within the rear four-fiber ferrule 511 of the East device 902 comprises Ports (fibers) E5 909, E6 910, E7 911 and E8 912 disposed such that these ports are exactly opposite to and facing the Ports E1 905, E2 906, E3 907 and E4 908, respectively. Three separate optical elements, a first 45°-counterclockwise-rotating λ/2 plate 515A, a second 45°-counterclockwise-rotating λ/2 plate 516A, and a 45°-clockwise-rotating Faraday rotator 516B are disposed adjacent to Ports E6 910, E7 911 and E8 912, respectively, in the direction of the rear lens 510. As further illustrated in FIG. 9D, the set of Ports (fibers) within the rear four ferrule 511 of the West device 904 comprises Ports (fibers) W5 917, W6 918, W7 919 and W8 920 disposed such that these ports are exactly opposite to and facing the Ports W1 913, W2 914, W3 915 and W4 916, respectively. Three separate optical elements, a 45°-counterclockwise-rotating λ/2 plate 51 5B, a 45°-clockwise-rotating λ/2 plate 515C, and a 45°-counterclockwise-rotating Faraday rotator 516C are disposed adjacent to Ports W5 917, W6 918 and W8 920, respectively, in the direction of the rear lens 510.

A summary of the operation of the optical passive components of the present invention as utilized in conjunction with a bi-directional amplifier system of the present invention is provided in FIGS. 10A, 10B, 11A and 11B. A summary of the optical paths of logical westbound (FIGS. 10A and 10B) and logical eastbound (FIGS. 11A and 11B) signals is represented. The eastbound and westbound signals each comprise one or the other of the two wavelength bands utilized in conjunction with the band bi-directional device, 500A, which is the first embodiment of the present invention. Alternatively, the eastbound and westbound signals each comprise one of the two interleaved sets of channels utilized in conjunction with the interleaved bi-directional device, 500B, which is the second embodiment of the present invention.

Figure 10B:
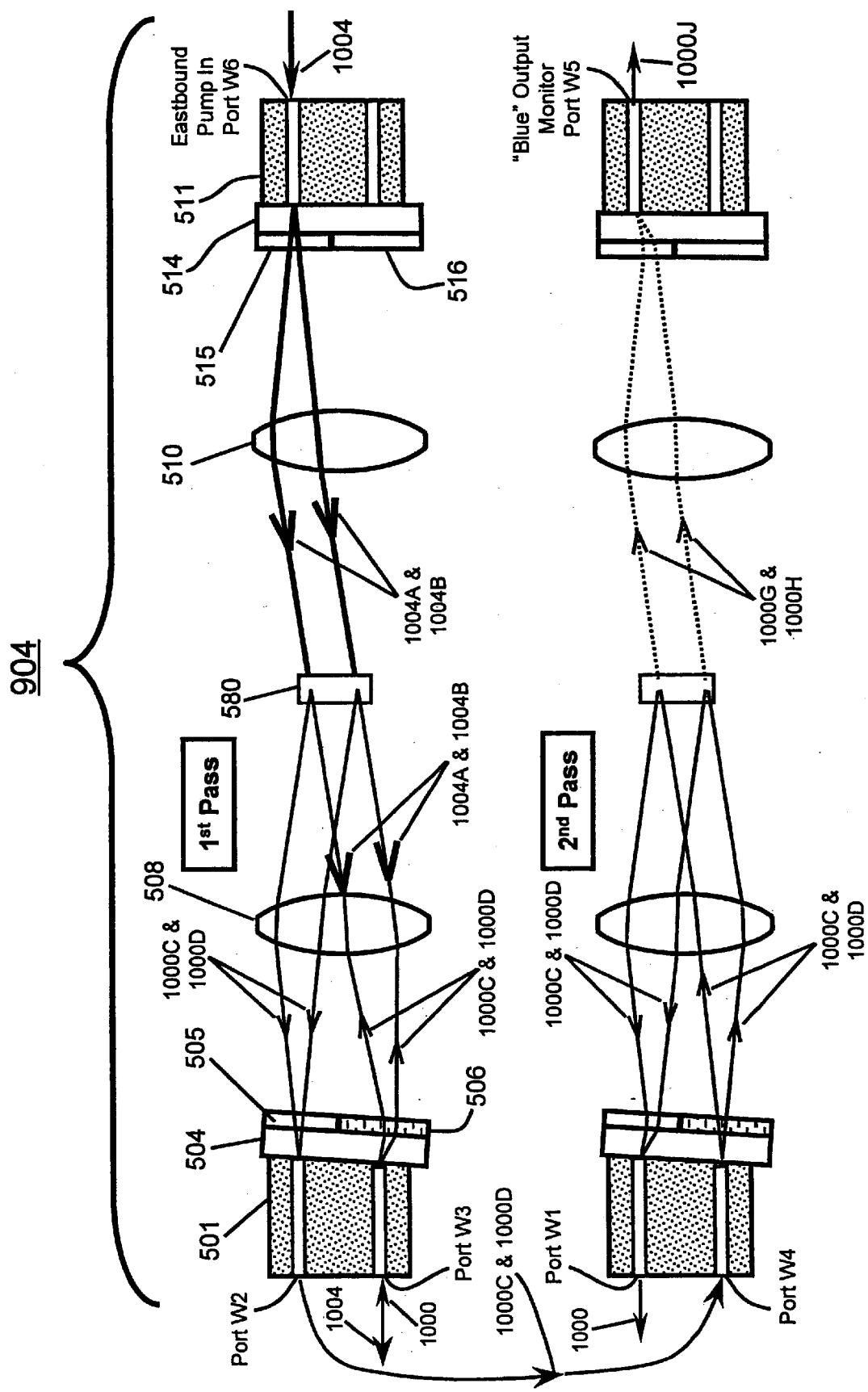
Figure 11A:
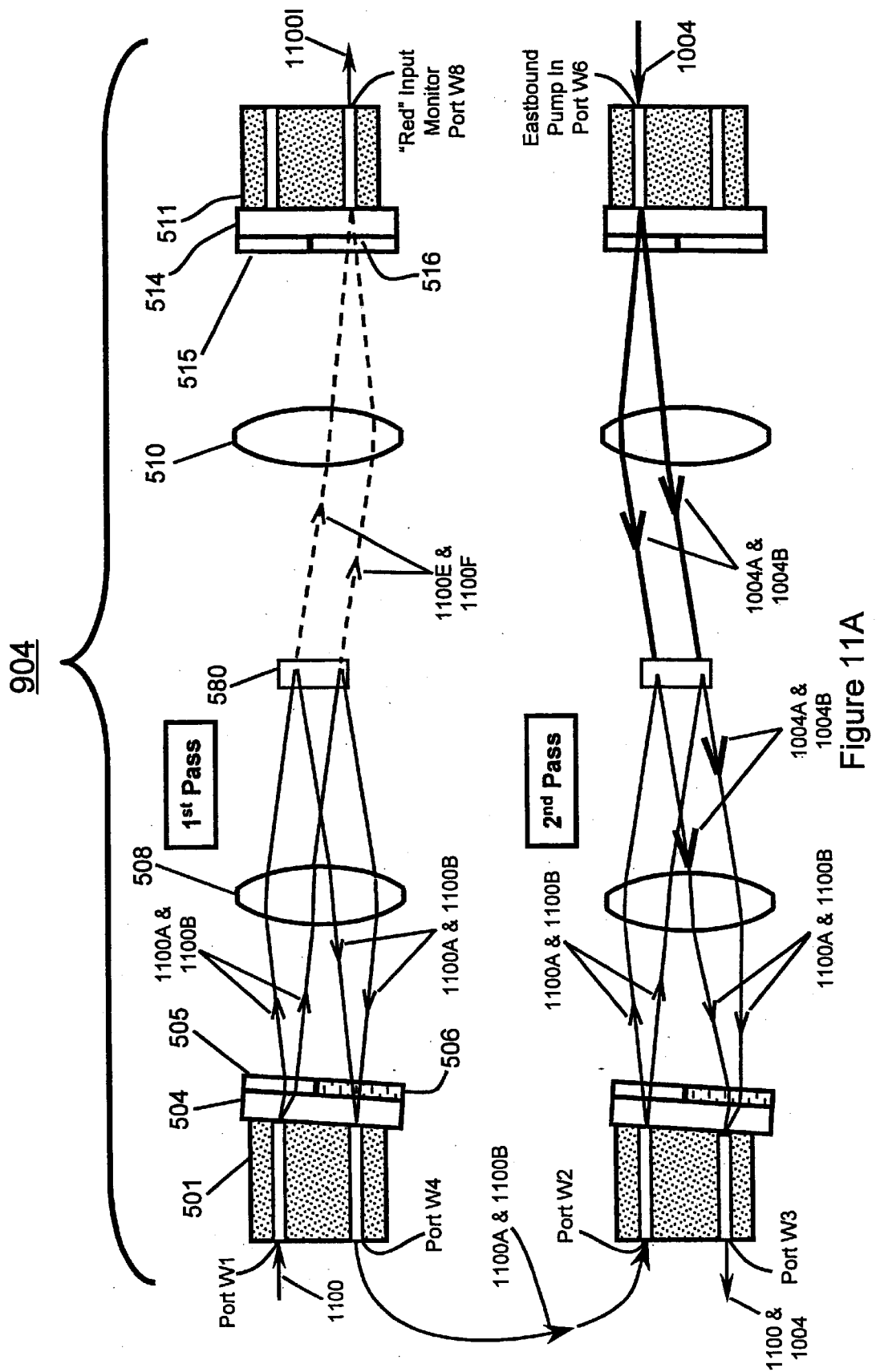
FIGS. 11A and 11B are side views of bounding ray paths of pump beams and of eastbound light signals within the West and East set of optical passive components, respectively.
Figure 11B:
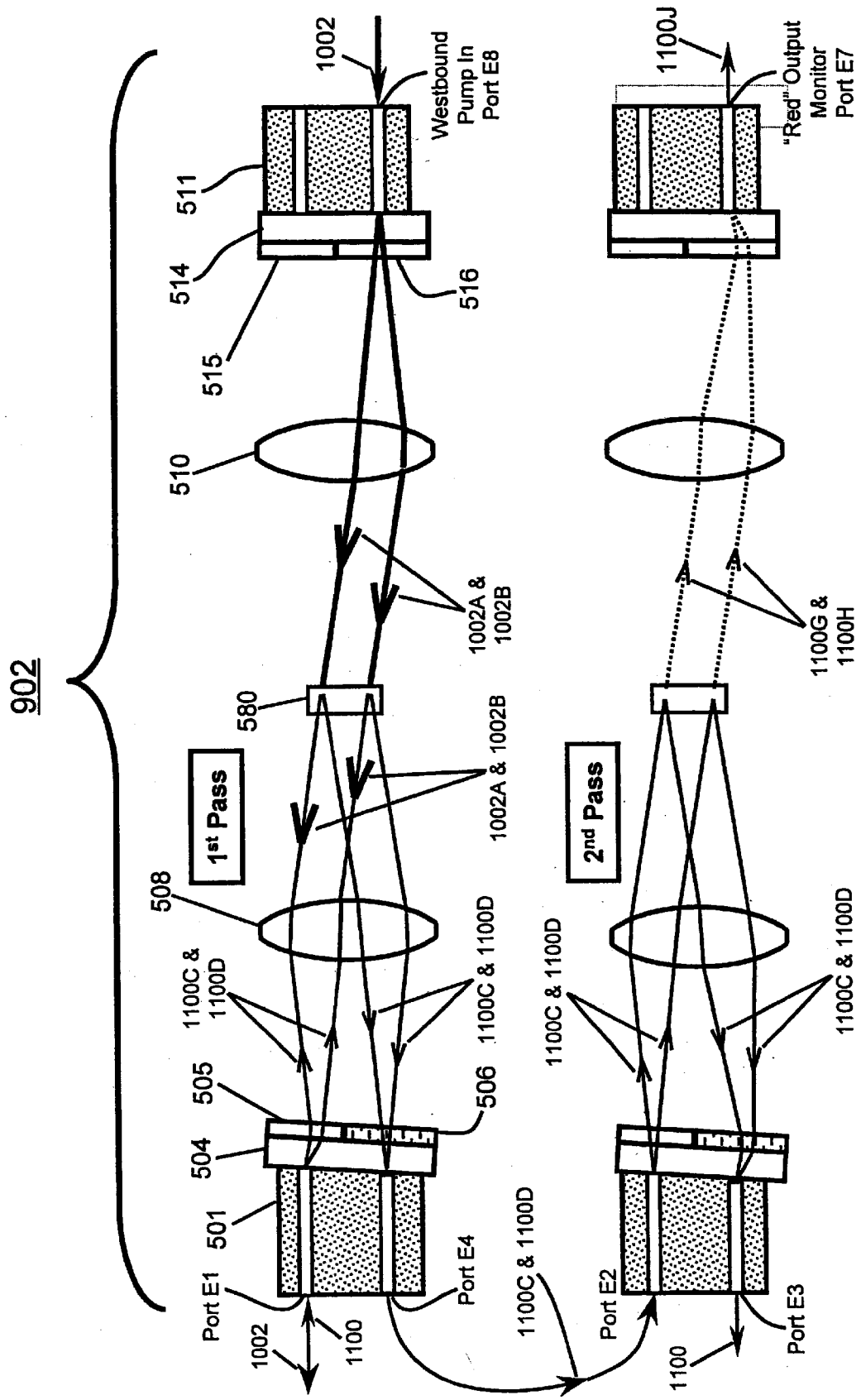

For example, if FIGS. 10A, 10B, 11A, and 11B show a bi-directional device of the first embodiment of the present invention, used in a band bi-directional system, then FIGS. 10A and 10B would be directed to a "blue" band of input signal light traveling in the east-to-west direction and FIGS. 11A and 11B would be directed to a "red" band of input signal light traveling in the west-to-east direction. Similar features of the second embodiment of the present invention related to the interleaved bi-directional device 500B would also be shown in FIGS. 10A, 10B, 11A, and 11B.

Each of the two counter propagating signals makes two consecutive traverses or passes through each of two devices, a logical East device 902 and a logical West device 904, whereby each device comprises an integrated set of optical passive components consistent with either one of the embodiments of the present invention. An appropriate optical amplifier gain element (not shown), such as an Er-doped fiber, is disposed between the East device and the West device. Signal propagation through the logical East device is illustrated in FIG. 10A and FIG. 11B whereas signal propagation through the logical West device is illustrated in FIG. 10B and FIG. 11A.

Each of the figures, FIGS. 10A, 10B, 11A and 11B, shows both of the two traverses of the particular signal-either the eastbound signal or westbound signal-through the particular device-either the East device or West device-illustrated therein. Each individual traverse comprises a diagonally opposed pair of ports or fibers-such as E1 905 and E4 908, E2 906 and E3 907, W1 913 and W4 916 or W2 914 and W3 915-within the four-fiber ferrule utilized for input and output. The two traverses of each signal through each device are optically coupled one to another in a polarization-preserving fashion by an optical coupling means (not shown) which may comprise a set of mirrors, a retro-reflector, polarization preserving fibers, or the like. The optical coupling connects the input and output of Ports E2 906 and E4 908 and also of Ports W2 914 and W4 916. Each signal traverse through each of the devices comprises one stage of optical isolation. Therefore, the two consecutive traverses of each signal through each device comprise double-stage optical isolation.

The present invention is explained using double-stage optical isolation. In addition, in the present invention, single-stage optical isolation (explained in detail in Bi-Directional Polarization-Independent Optical Isolator) may also be used. For example, in the present invention, an assembly of four parallel optical ports is optically coupled to the bi-directional polarization independent optical isolator such that corresponding input and output of each pass of the two separate signal rays through the isolator is coupled to a pair of diagonally disposed ports. The four ports are configured such that either single-stage bi-directional isolation is accomplished for each of two optical transmission lines or double stage bi-directional isolation is accomplished on a single optical transmission line.

In addition to simple signal propagation through each of the East and West devices, pump laser beams are injected or removed and small proportions of signals are monitored at various stages. These additional optical pathways are made possible by the reflective properties of the reflective elements within either the reflector/waveplate assembly 509, or the non-linear interferometer, 519, of the first and second embodiments, 500A and 500B, respectively, of the present invention. Each monitored signal or injected laser pump beam comprises a light beam that is transmitted through these reflective elements from front-to-back or from back-to-front, respectively. Thus, each monitored signal is input at one of the front ports and monitored at one of the rear ports and each laser pump beam is input at one of the rear ports and output at one of the front ports. Because of the image inversion properties of the pair of lenses, 508 and 510, the separate members of the resulting pairs of ports are disposed diagonally relative to one another, as viewed end-on in FIGS. 9A through 9D. As discussed further below, the two laser pump beams propagate in opposite directions through the bi-directional amplifier system and the set of optics comprising the beam path of each of the pump laser beams within each device, 902 and 904, comprises an optical isolator. Thus, back injection of the beam from one laser into the other laser is prevented, thereby preventing damage to either.

The full path of a westbound-propagating signal 1000 through the two devices is illustrated in FIGS. 10A–10B. As shown in FIG. 10A, the westbound-propagating signal 1000 first enters the logical East device 902 through Port E3 907. As discussed in greater detail below, the signal 1000 is separated into two linearly polarized sub-signals, 1000A and 1000B, upon entering device 902. Note that, to prevent a confusion of lines, such sub-signals are not distinguished from one another in FIGS. 10A, 10B, 11A and 11B. The greater proportion (>95%) of each of the sub-signals 1000A and 1000B passes through only the front portion of device 902 (i.e., not including the rear lens 510 or components to the rear thereof) so as to re-emerge through Port E2 906 of the front ferrule 501. However, small proportions (<5%) of each of these sub-signals, wherein such proportions comprise sub-signals 1000E and 1000F, are diverted to Port E6 910 of the rear ferrule 511 for input monitoring purposes. These two sub-signals 1000E and 1000F are combined by the optics disposed to the front of Port E6 so as to form the monitored signal 10001.

After emerging from Port E2 906, the two sub-signals 1000A and 1000B are optically transferred from Port E2 906 to Port E4 908 by the optical coupling means (not shown) so as to make a second traverse through the East device 902. Because this coupling occurs in polarization preserving fashion, the separate identities of the two sub-signals 1000A and 1000B are maintained between the first and second traverses. Upon the second traverse through the East device 902, the greater proportion (>95%) of each of the sub-signals 1000A and 1000B passes through only the front portion of device 902 so as to finally emerge from said device through Port E1 905 as the re-combined signal 1000. Additionally, a westbound laser pump beam 1002, comprising two linearly polarized sub-beams, 1002A and 1002B within device 902, is injected into the device through Port E8 912. Note that, to prevent a confusion of lines, these sub-beams are not distinguished from one another in FIGS. 10A and 11B. The sub-beams 1002A and 1002B are re-combined into pump beam 1002 and emerge from the East device 902 at Port E1 905 together with the signal 1000.

After emerging from the logical East device 902, the westbound signal 1000 propagates through the optical gain element (such as an EDF), together with the westbound 1002 and eastbound 1004 laser pump beams where it is amplified. As shown in FIG 10B, the amplified westbound signal 1000 is then transferred from the optical gain element to the Port W3 915 of the logical West device 904 so as to make a first traverse therethrough. Upon entering the West device 904, the amplified signal 1000 is separated into two linearly polarized sub-signals, 1000C and 1000D. Note that, to prevent a confusion of lines, these sub-signals are not distinguished from one another in FIG. 10B. The greater proportion (>95%) of each of the sub-signals 1000C and 1000D passes through only the front portion of device 904 so as to re-emerge through Port W2 914. Also, an eastbound laser pump beam 1004 is injected into the West device 904 through Port W6 918 where it is immediately separated into sub-beams 1004A and 1004B. Note that, to prevent a confusion of lines, these sub-beams are not distinguished from one another in FIG. 10B. These sub-beams 1004A and 1004B propagate through the West device 904 so as to emerge from Port W3 915 as a re-combined beam 1004 that is thenceforth transferred into the optical gain element.

After emerging from Port W2 914, the two sub-signals 1000C and 1000D are optically transferred from Port W2 914 to Port W4 916 by the optical coupling means (not shown) so as to make a second traverse through the West device 904. Because this coupling occurs in polarization preserving fashion, the separate identities of the two sub-signals 1000C and 1000D are maintained between the first and second traverses. Upon the second traverse through the West device 904, the greater proportion (>95%) of each of the sub-signals 1000C and 1000D passes through only the front portion of device 904 so as to finally emerge from said device through Port W1 913 as the re-combined amplified signal 1000. At this point, the amplified signal 1000 exits the bi-directional amplifier system and re-joins the lightwave communications system in the logical westbound direction. Small proportions (<5%) of each of the sub-signals 1000C and 1000D, wherein said proportions comprise sub-signals 1000G and 1000H, are diverted to Port W5 917 of the rear ferrule 511 of device 904 for output monitoring purposes. The two sub-signals 1000G and 1000H are recombined by the optics disposed to the front of port W5 so as to form the monitored signal 1000J.

The full path of an eastbound-propagating signal 1100 through the two devices comprising the bi-directional optical amplifier system is illustrated in FIGS. 11A–B. Note that, to prevent a confusion of lines, all pairs of sub-signals are not distinguished from one another in FIGS. 11A and 11B. The path of eastbound-propagating signal 1100 is exactly opposite to that of westbound-propagating signal 1000. That is, as shown in FIG. 11A, signal 1100 enters the logical West device 904 through Port W1 913 and is separated into two sub-signals 1100A and 1100B which make a first traverse through device 904 so as to emerge through Port W4 916. During this first traverse, small (approximately 5% or less) proportions of sub-signals 1100A and 1100B, comprising sub-signals 1100E and 1100F, respectively, are diverted to Port W8 920 so as to be recombined into the input monitor signal 1100I. Immediately after emerging from Port W4, the two sub-signals 1100A and 1100B are optically transferred, in a polarization-preserving fashion, into Port W2 914 so as to make a second traverse through device 904. These two sub-signals emerge from this second traverse through device 904 through Port W3 915 as the re-combined signal 1100. The signal 1100 is then transferred into the optical gain element where it is amplified.

Referring now to FIG. 11B, after emerging from the optical gain element, the amplified eastbound signal 1100 then enters the East device 902 through Port E1 905 and is then separated into two linearly polarized sub-signals 1100C and 1100D. The sub-signals 1100C and 1100D each make a first traverse through East device 902 and emerge from Port E4 908. Immediately thereafter, the two sub-signals 1100C and 1100D are optically transferred, in a polarization-preserving fashion, into Port E2 906 so as to make a second traverse through device 902. During this second traverse, small (approximately 5% or less) proportions of sub-signals 1100C and 1100D, comprising sub-signals 1100G and 1100H, respectively, are diverted to Port E7 911 so as to be recombined into the output monitor signal 1100J. The two sub-signals 1100C and 1100D emerge from this second traverse through device 902 through Port E3 907 as the re-combined amplified signal 1100. At this point, the amplified signal 1100 exits the bi-directional amplifier system and re-joins the lightwave communications system in the logical eastbound direction.

The detailed operation of either embodiment of the current invention as a bi-directional amplifier system is shown in FIGS. 12A–D and FIGS. 13A–D. FIGS. 12A–D illustrate detailed light ray paths and polarization states for signals and laser pump beams within the logical East device of either a band bi-directional or an interleaved bi-directional amplifier system. FIGS. 13A–D illustrate detailed light ray paths and polarization states for signals and laser pump beams within the complementary logical West device. In FIGS. 12A–D and FIGS. 13A–D, the disposition of components is as shown in either FIG. 5A or FIG. 5B except that a single element 580 is used to represent either the reflector/waveplate assembly 509 or the selective pass-through non-linear interferometer 519. In the former case, the system is a band bi-directional amplifier system; in the latter case, it is an interleaved bi-directional amplifier system. The paths of signals through either such system are similar except that, in the band bi-directional system, westbound and eastbound signals comprise light of the "blue" band and "red" band, respectively, whereas, in the interleaved bi-directional system, these signals comprise light of the first set of interleaved bands and of the second set of interleaved bands, respectively.

In FIGS. 12A–D and FIGS. 13A–D, solid and dashed medium-weight lines with affixed directional arrows represent the respective paths of sub-signals comprising linearly polarized light rays having mutually perpendicular polarization plane orientations. Likewise, solid and dashed light-weight lines with affixed directional arrows represent the respective paths of small proportions of the aforementioned sub-signals utilized for intensity monitoring. Likewise, solid and dashed heavy-weight lines with affixed directional arrows represent the respective paths of sub-beams of pump laser light comprising linearly polarized rays having mutually perpendicular polarization plane orientations. Furthermore, double-barbed arrows contained within circles in FIGS. 12A–D and FIGS. 13A–D represent the orientations of polarization planes of linearly polarized light sub-signals or sub-beams as viewed from a fixed reference point at the left side of the respective diagram.

Figure 12A:
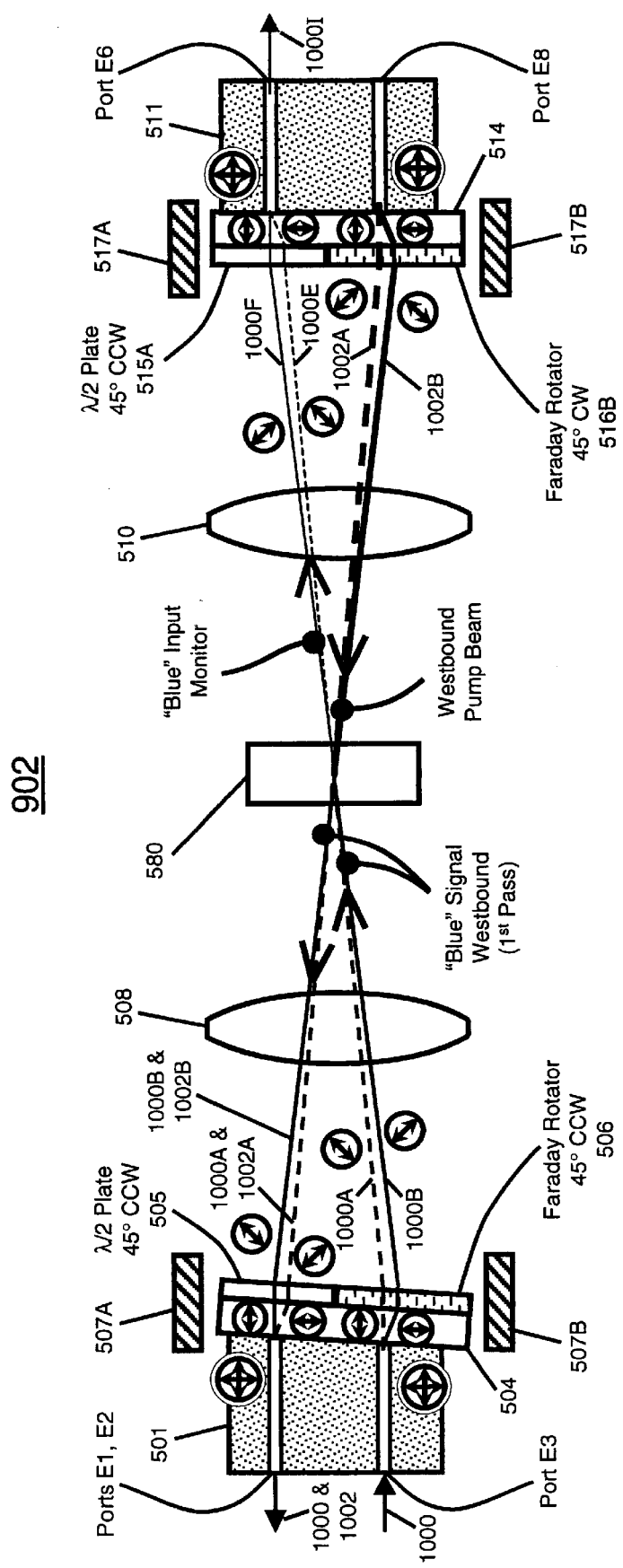
FIGS. 12A and 12B are side views of the operation of the East bi-directional optical passive components in a bi-directional amplifier system showing central ray paths for light signals of the westbound channels in each of the two principal polarization states propagating east-to-west and west-to-east, respectively.
Figure 12B:
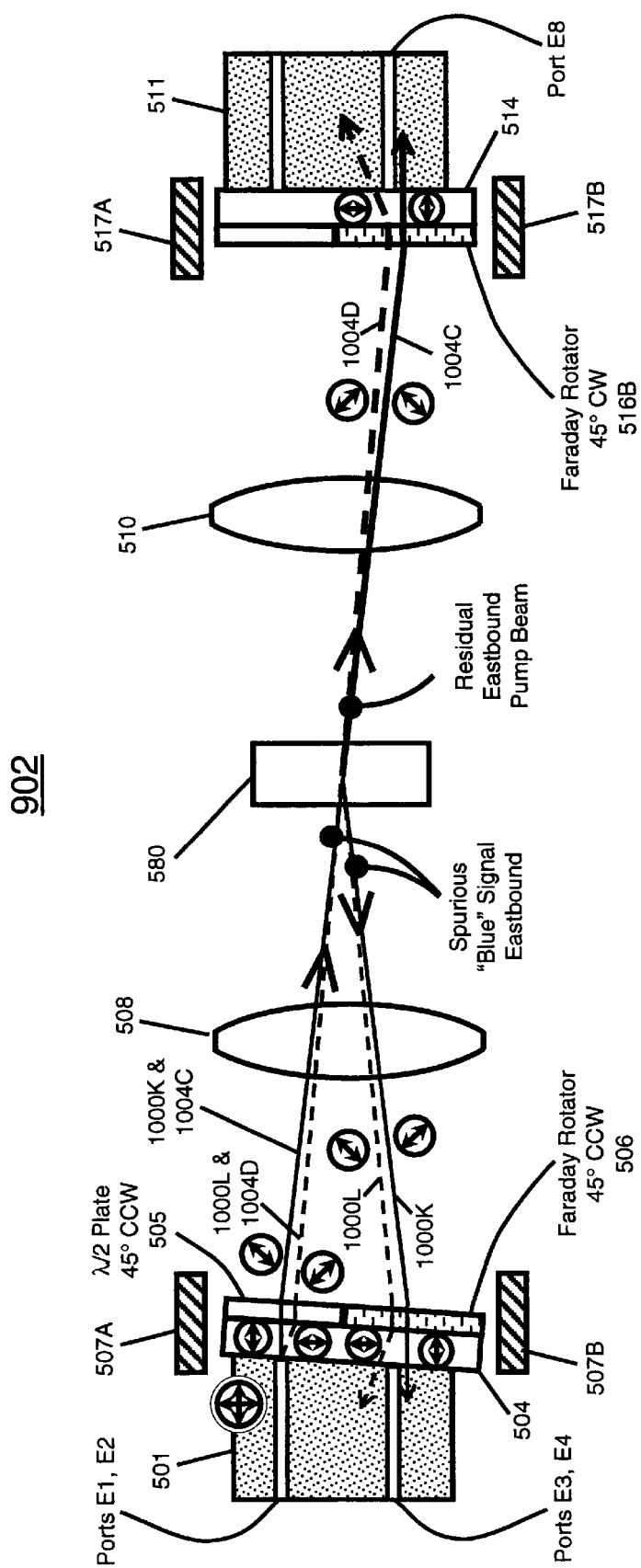
Figure 12C:
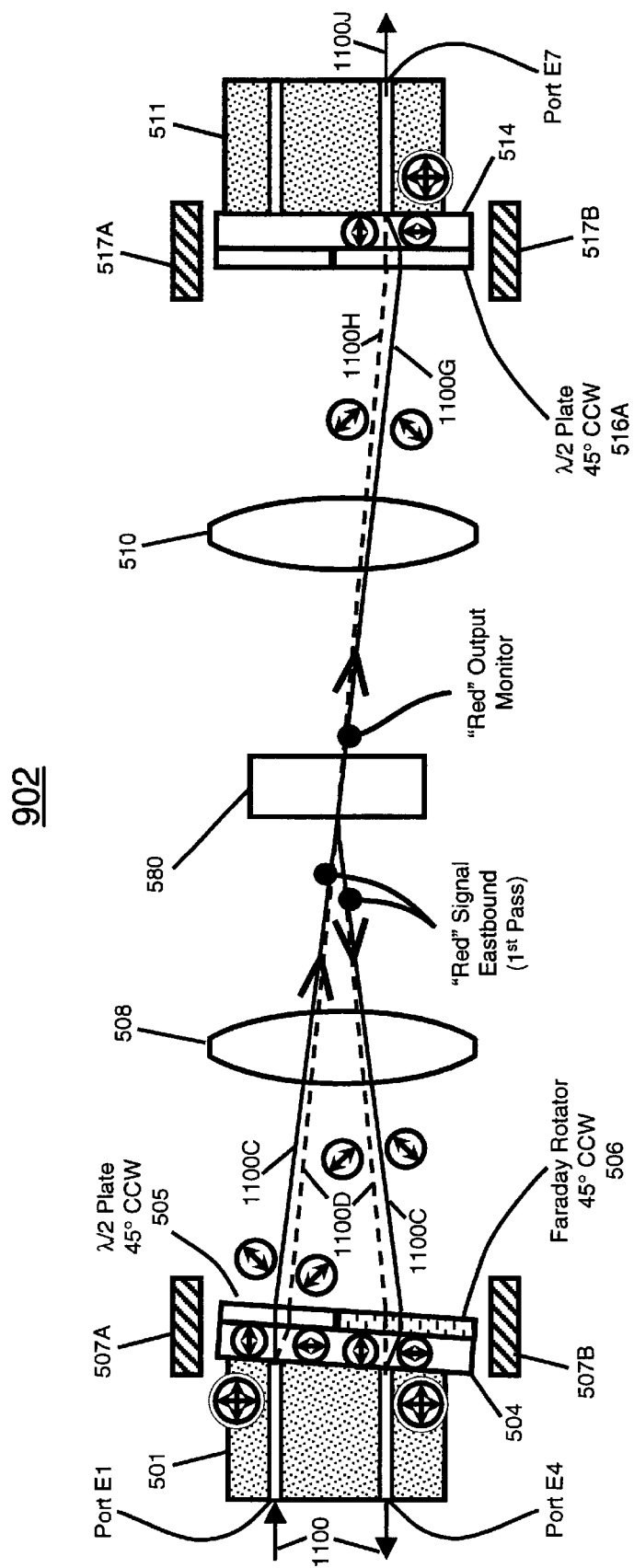
FIGS. 12C and 12D are side views of the operation of the East bi-directional optical passive components in a bi-directional amplifier system showing central ray paths for light signals of the eastbound channels in each of the two principal polarization states propagating west-to-east and east-to-west, respectively.
Figure 12D:
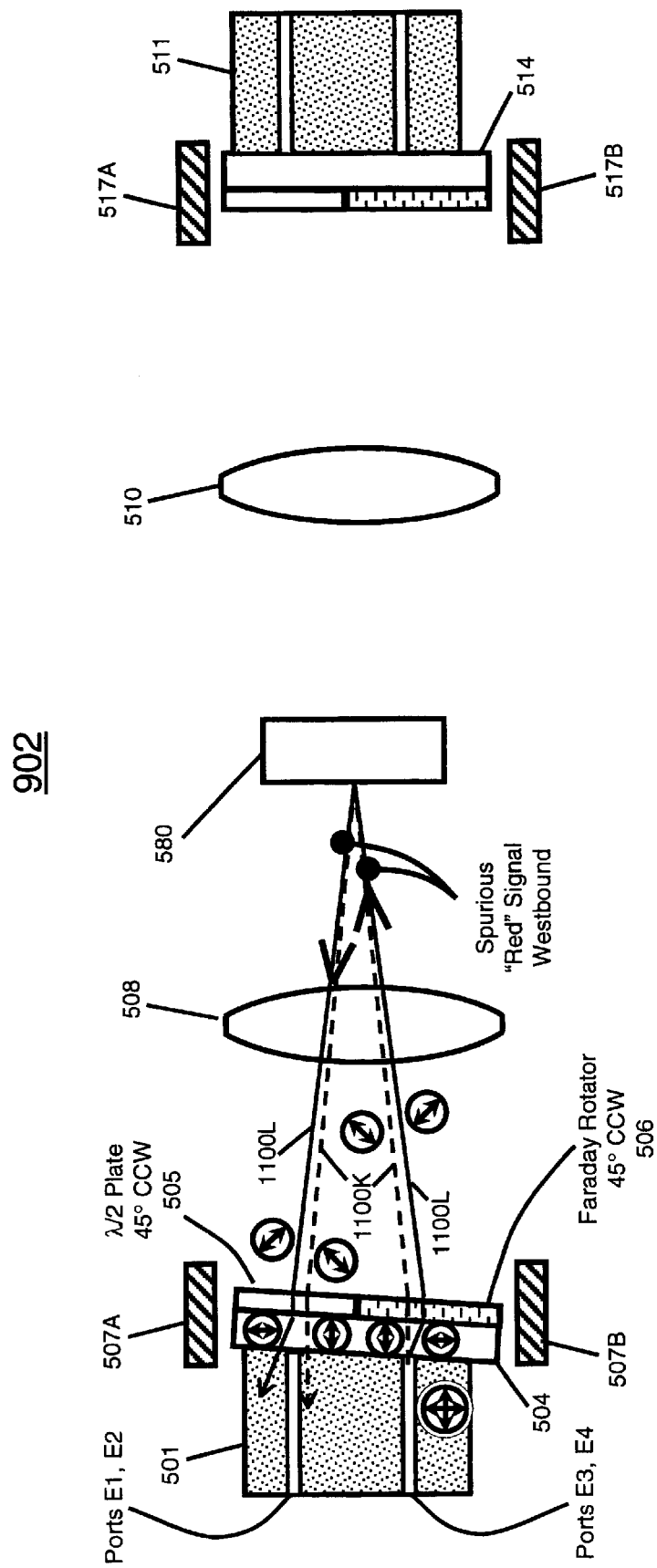

FIGS. 12A through 12D each show a bi-directional isolator, and, more particularly, an East bi-directional isolator. More particularly, FIG. 12A shows an East bi-directional isolator through which an east-to-west signal of the blue band (first interleaved set of bands) passes, an east-to-west pump laser light, and a blue signal input monitor. FIG. 12B shows an East bi-directional isolator which rejects a west-to-east traveling signal of the blue band (first interleaved set of bands) and which rejects a west-to-east traveling residual pump laser signal. FIG. 12C shows an East bi-directional isolator through which passes a west-to-east traveling signal of the red band (second interleaved set of bands), and which includes a red output monitor. FIG. 12D shows an East bi-directional isolator which rejects an east-to-west traveling signal of the red band (second interleaved set of bands).

More particularly, FIGS. 12A and 12B are side views of the operation of the East bi-directional optical passive components 902 in a bi-directional amplifier system showing central ray paths for light signals of the westbound channels in each of the two principal polarization states propagating east-to-west and west-to-east, respectively, and FIGS. 12C and 12D are side views of the operation of the East bi-directional optical passive components in a bi-directional amplifier system showing central ray paths for light signals of the eastbound channels in each of the two principal polarization states propagating west-to-east and east-to-west, respectively.

Also shown in FIG. 12A are central ray paths, within the East bi-directional optical passive components, for light, in each of two principal polarization states, of westbound pump laser light and monitored westbound signal light. Also shown in FIG. 12B are central ray paths, within the East bi-directional optical passive components, for light, in each of two principal polarization states, of residual eastbound pump laser light. Also shown in FIG. 12C are central ray paths, within the East bi-directional optical passive components, for light, in each of two principal polarization states, of monitored eastbound signal light.

Figure 13A:
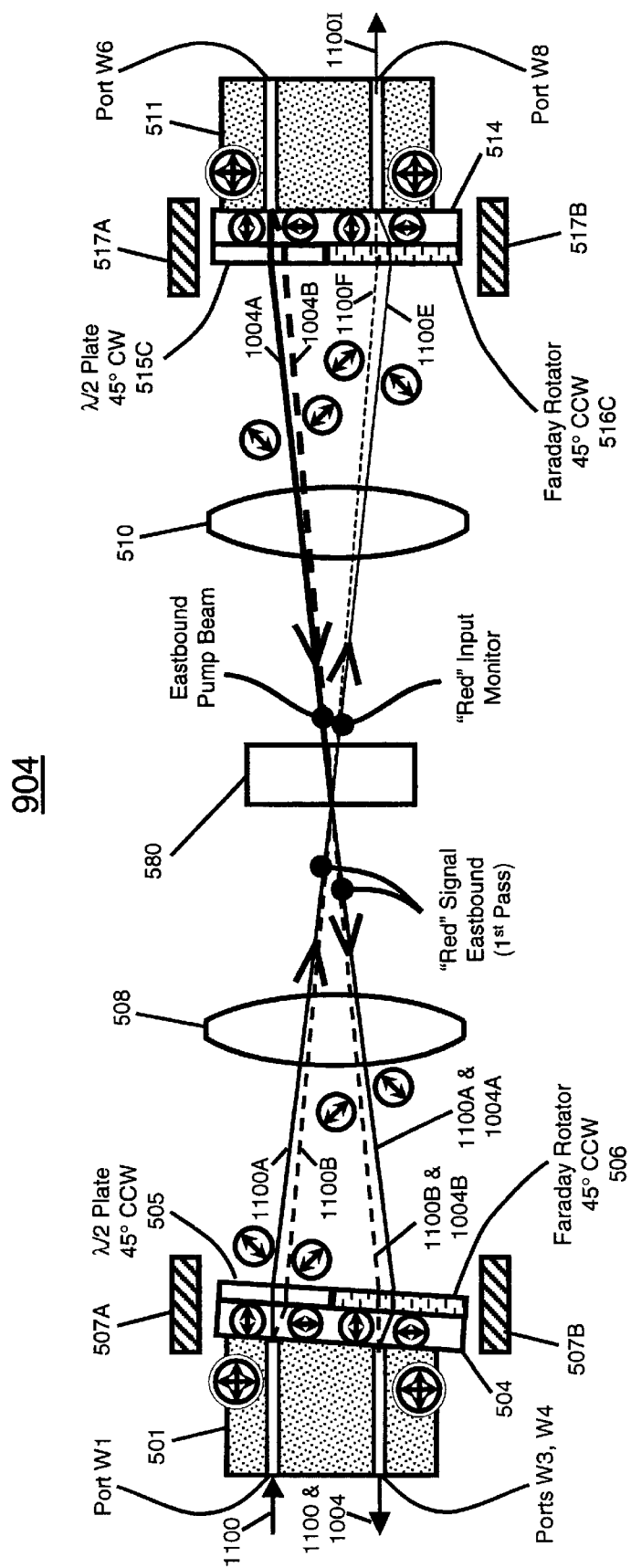
FIGS. 13A and 13B are side views of the operation of the West bi-directional optical passive components in a bi-directional amplifier system showing central ray paths for light signals of the eastbound channels in each of the two principal polarization states propagating west-to-east and east-to-west, respectively.
Figure 13B:
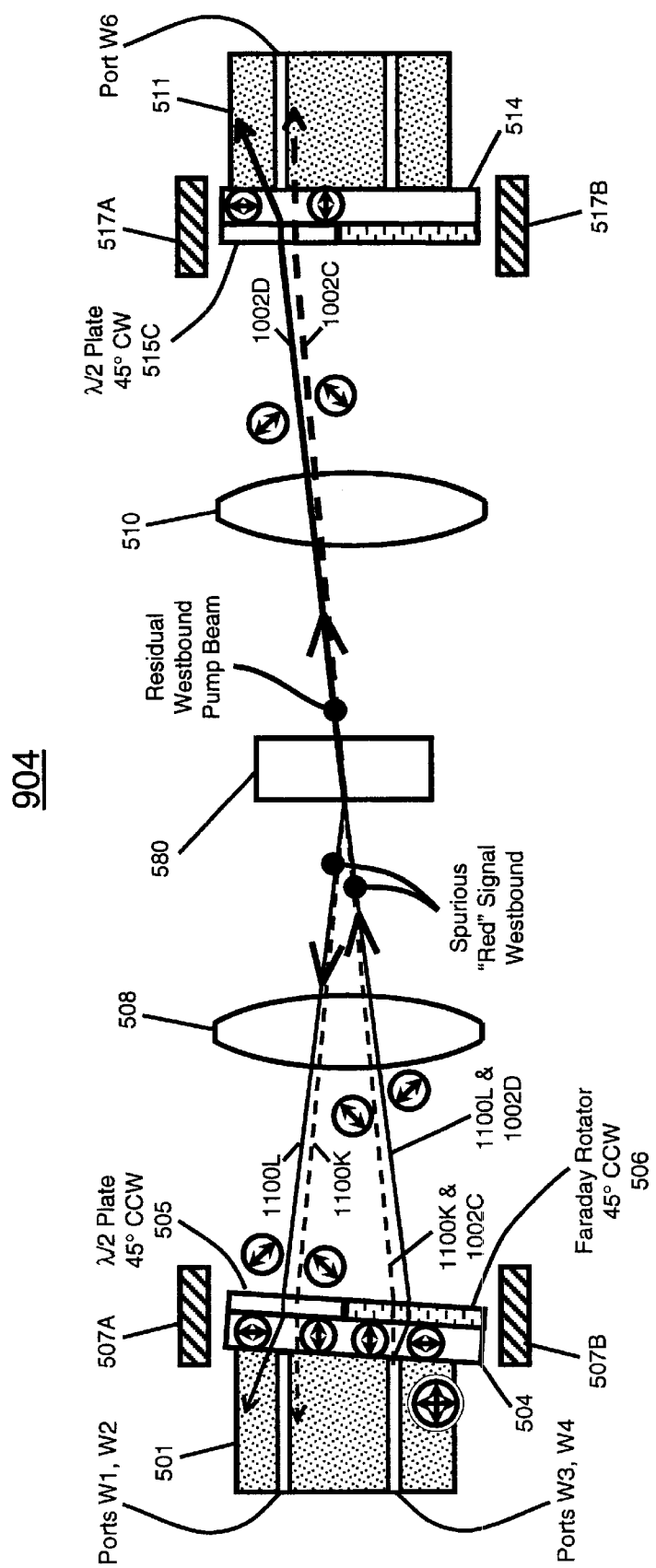
Figure 13C:
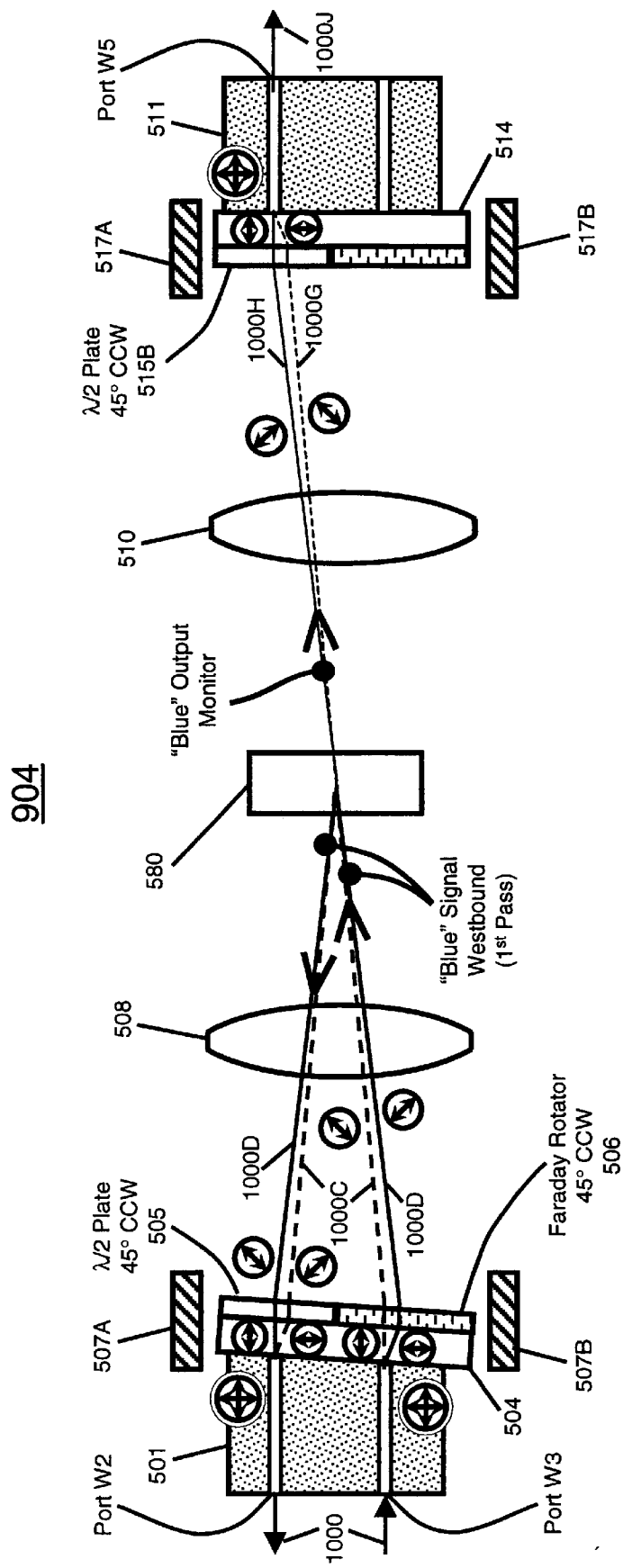
FIGS. 13C and 13D are side views of the operation of the West bi-directional optical passive components in a bi-directional amplifier system showing central ray paths for light signals of the westbound channels in each of the two principal polarization states propagating east-to-west and west-to-east, respectively.
Figure 13D:
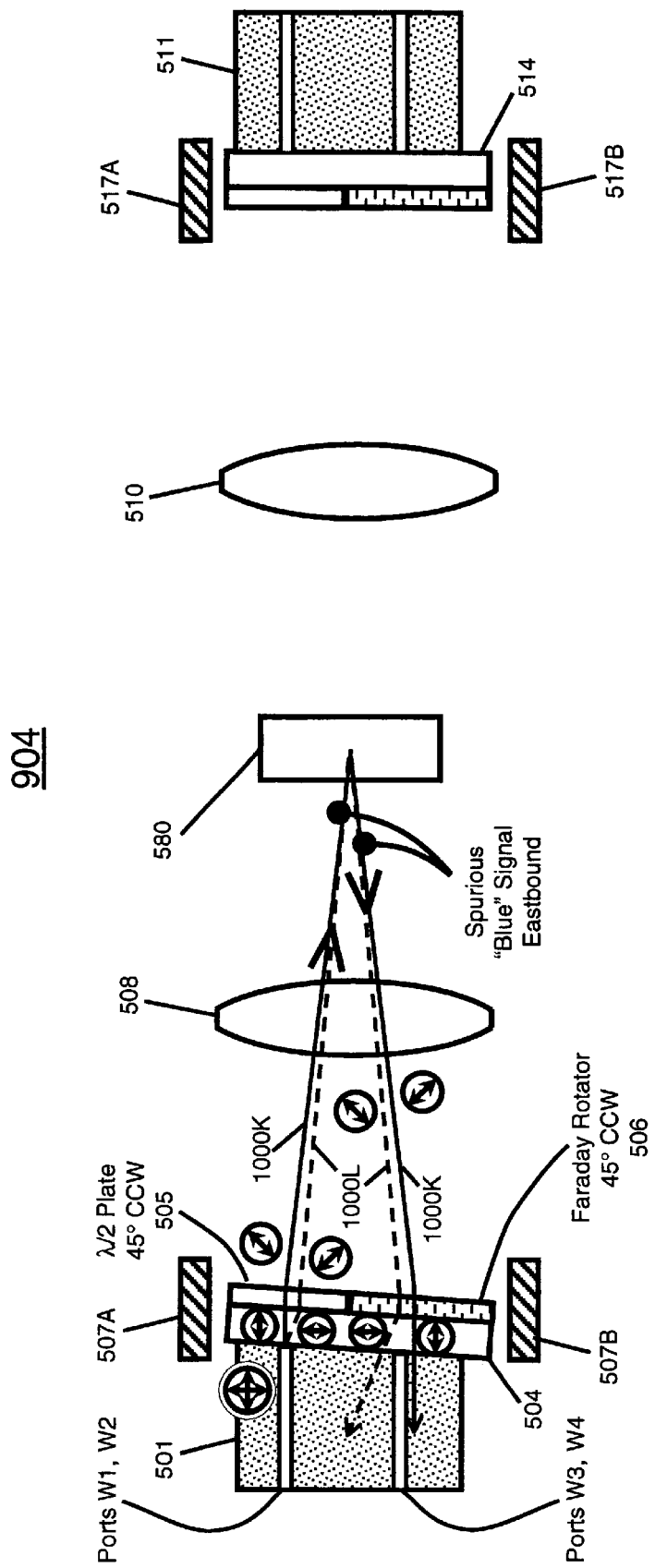

In addition, FIGS. 13A and 13B are side views of the operation of the West bi-directional optical passive components 904 in a bi-directional amplifier system showing central ray paths for light signals of the eastbound channels in each of the two principal polarization states propagating west-to-east and east-to-west, respectively, and FIGS. 13C and 13D are side views of the operation of the West bi-directional optical passive components in a bi-directional amplifier system showing central ray paths for light signals of the westbound channels in each of the two principal polarization states propagating east-to-west and west-to-east, respectively.

FIG. 13A shows a West bi-directional isolator through which passes a west-to-east traveling signal of the red band (second interleaved set of bands), which includes a pump laser signal traveling west-to-east, and a red signal input monitor. Also shown in FIG. 13A are central ray paths, within the West bi-directional optical passive components, for light, in each of two principal polarization states, of eastbound pump laser light and monitored eastbound signal light.

FIG. 13B shows a West bi-directional isolator which rejects an east-to-west traveling signal of the red band (second interleaved set of bands) and which rejects a residual pump laser signal traveling east-to-west. Also shown in FIG. 13B are central ray paths, within the West bi-directional optical passive components, for light, in each of two principal polarization states, of residual westbound pump laser light.

FIG. 13C shows a West bi-directional isolator through which an east-to-west traveling signal of the blue band (first interleaved set of bands) passes, and which includes a blue signal output monitor. Also shown in FIG. 13C are central ray paths, within the West bi-directional optical passive components, for light, in each of two principal polarization states, of monitored westbound signal light.

FIG. 13D shows a West bi-directional isolator which rejects a west-to-east traveling signal of the blue band (first interleaved set of bands).

The front set of elements comprising the reflector/waveplate assembly 509 of the first embodiment, 500A, together with all elements disposed to the front thereof comprises a band bi-directional polarization independent optical isolator. The front set of elements comprising the selective pass-through non-linear interferometer 519 of the second embodiment, 500B, together with all elements disposed to the front thereof comprises an interleaved bi-directional polarization independent optical isolator. More specifically, because, in the current invention, the signals make two consecutive separate traverses through these isolators, the aforementioned front sets of elements comprise double stage band bi-directional and double stage interleaved bi-directional polarization independent optical isolators, respectively. The single stage and double stage band bi-directional polarization independent optical isolators and the single stage and double stage interleaved bi-directional optical isolators are embodiments of an invention disclosed in Bi-Directional Polarization-Independent Optical Isolator.

The aforementioned two bi-directional optical isolators have properties such that signals of a first set of wavelengths are allowed to propagate therethrough in a first direction but are prevented from propagating therethrough in the opposite or second direction and signals of a second set of wavelengths are allowed to propagate therethrough in the second direction but are prevented from propagating therethrough in the first direction. In the band bi-directional optical isolator, the first and second sets of wavelengths respectively comprise each one of two wavelength bands, such as a shorter wavelength or "blue" band and a longer wavelength or "red" band as illustrated in FIG. 3. Each such band may comprise one or more signal channels. In the interleaved bi-directional optical isolator, the first and second sets of wavelengths respectively comprise each one of two sets of interleaved bands within a multichannel system, such as is illustrated in FIGS. 4A–C.

Together, FIG. 12 and FIG. 13 provide detailed information on the operation of each of the logical East device and the logical West device as a set of optical passive components for a bi-directional amplifier system. Furthermore, these figures also provide detailed information on the operation of the integrated system, comprising the sets of optical passive components together with an optical gain element, lasers, optical detectors and comparison and control logic, as a bi-directional amplifier system. A schematic block diagram of such a bi-directional amplifier system is illustrated, for instance, in FIG. 14.

As mentioned above, the front set of components of each device comprise bi-directional optical isolators. This front set of components comprises the pathway of the greater proportion of each signal propagating through each device and is identical between the East and West devices. The details of the operation of each bi-directional isolator are provided in Bi-Directional Polarization-Independent Optical Isolator. Briefly, however, FIG. 12A and FIG. 13C demonstrate the passage, through the logical East device and the logical West device, respectively, of westbound signals in the West direction. Also, FIG. 12B and FIG. 13D demonstrate the inhibited passage or rejection, within the logical East device and the logical West device, respectively, of westbound signals spuriously reflected or scattered backward in the east direction. Furthermore, FIG. 12C and FIG. 13A demonstrate the passage, through the logical East device and the logical West device, respectively, of eastbound signals in the east direction. Finally, FIG. 12D and FIG. 13B demonstrate the inhibited passage or rejection, within the logical East device and the logical West device, respectively, of eastbound signals spuriously reflected or scattered backward in the west direction.

The signal bi-directional optical isolator sections of each integrated set of optical passive components function through the separation, at a birefringent element, of incoming signals into physically separated sub-signals whose light rays have mutually perpendicular linear polarization directions, propagation of said sub-signals through both a reciprocal 45° rotation element and a non-reciprocal 45° rotation element, and propagation of said rotated sub-signals through a second or the same birefringent element. The birefringent element(s) separate unpolarized or randomly polarized light into two linearly polarized physically separated beams, an undeflected o-ray and a deflected e-ray. In the terminology used herein, reciprocal rotators have the property such that the direction of rotation about the axis of light propagation, either clockwise (CW) or counter-clockwise (CCW), is always the same when viewed facing the rotator towards the side at which the linearly polarized light beam enters the element. Conversely, non-reciprocal (non-reversible) rotators have the property such that the direction of polarization plane rotation about the axis of light propagation, either clockwise (CW) or counter-clockwise (CCW), is always the same when viewed facing the rotator from a fixed reference point in a fixed direction, regardless of the propagation direction of the light ray through the element. In the current invention, the $\lambda/2$ plates are reciprocal rotators and the Faraday rotation elements are non-reciprocal rotators.

Additional properties of the present invention not previously disclosed in Bi-Directional Polarization-Independent Optical Isolator are the ability to inject a westbound pump laser beam into the system from the logical East device (FIG. 12A), the ability to block residual eastbound pump laser light from entering the East laser (FIG. 12B), the ability to inject an eastbound pump laser beam into the system from the logical West device (FIG. 13A), the ability to block residual westbound pump laser light from entering the West laser (FIG. 13B), the ability to monitor the input westbound signal at the East device (FIG. 12A), the ability to monitor the output eastbound signal at the East device (FIG. 12C), the ability to monitor the input eastbound signal at the West device (FIG. 13A), and the ability to monitor the output westbound signal at the West device (FIG. 13C).

The optical passive components of the present invention provide an additional bi-directional optical isolator function by preventing the entry of pump laser light from each laser into the other laser. The operation of this functionality at the East device is now described with reference to FIG. 5A, FIGS. 9A through 9D, FIG. 10A, FIG. 12A and FIG. 12B. Operation at the West device is similar and will not be re-described in detail.

Injection of westbound pump laser light 1002 into the system is first described. This injection occurs through Port E8 912 in the rear four-fiber ferrule 511 of the East device 902. This laser light immediately passes into and through the birefringent walk-off plate 514 that physically separates it into two linearly polarized sub-lights 1002A and 1002B. As shown in FIG. 12A, the optical axis of the birefringent plate 514 is oriented such that sub-light 1002A is a horizontally polarized o-ray whilst sub-light 1002B is a vertically polarized e-ray during its respective traverse through plate 514. The separation of sub-lights 1002A and 1002B is effected by the deflection of the e-ray, which is sub-light 1002B. Immediately after leaving birefringent plate 514, the sub-lights 1002A and 1002B pass through the Faraday rotator 516B which, upon passage therethrough, imparts a 45° CW rotation (as viewed end-on from the left side of FIG. 12A) upon the direction of each of their polarization planes.

The two sub-lights 1002A and 1002B then pass towards and through the rear lens 510 that collimates them and directs them through either the mirror/waveplate assembly 509 or the selective pass-through non-linear interferometer 519 (both represented as element 580 in FIG. 12A) depending upon whether the device comprises the first or the second embodiment of the present invention, respectively. Because the sub-lights 1002A and 1002B are of a wavelength shorter than 1500 nm, and because of the wavelength dependent transmission characteristics of either the mirror/waveplate assembly 509 (FIG. 7) or of the non-linear interferometer 519 (FIG. 8), these sub-lights are transmitted completely therethrough without attenuation. Furthermore, because of the presence of the compensating plates, either $\lambda/4$ plate 608 (FIG. 6) or the first compensating wave plate 814 together with the second compensating wave plate 816 (FIG. 8), these sub-lights are transmitted through either mirror/waveplate assembly 509 or the non-linear interferometer 519 without a change in polarization. The sub-lights 1002A and 1002B then enter and pass through the front lens 508 which focuses and directs them towards and into the front $\lambda/2$ plate 505. The front $\lambda/2$ plate 505 reversibly rotates directions of the planes of polarization of each of sub-lights 1002A and 1002B by 45° CCW about the direction of propagation or 45° CW as viewed from the left side of FIG. 12A since these sub-lights propagate from back to front.

After passing through the $\lambda/2$ plate 505, the sub-lights 1002A and 1002B enter and pass through the front birefringent plate 504. During their passage through front birefringent plate 504 as shown in FIG. 12A, the sub-lights 1002A and 1002B are vertically and horizontally polarized, respectively. Because the optic axis of front birefringent plate 504 is symmetrically disposed about a vertical plane with respect to that of rear birefringent plate 514, then sub-light 1002A and 1002B pass through front birefringent plate 504 as a deflected e-ray and as an undeflected o-ray, respectively. Furthermore, since the thickness and material of birefringent plates 504 and 514 are identical, the deflection of sub-light 1002A during its passage through front birefringent plate 504 is exactly equal and opposite to that of sub-light 1002B during its passage through rear birefringent plate 514. Thus, upon exiting front birefringent plate 504, the two sub-lights 1002A and 1002B are re-combined so as to regenerate the laser light 1002.

Because of the image reversing properties of the pair of lenses 508 and 510, the regenerated laser light 1002 enters the front port or fiber-namely Port E1 905-that is diagonally disposed relative to the rear port-namely Port E8 912-from which it was injected.

As seen in FIG. 10A, the Port E1 905 is directly optically coupled to the optical gain element. In this way, westbound pump laser light is injected into the optical gain element at the East device.

It is possible that residual eastbound (westbound) laser pump light 1004 (1002) originally injected at the West (East) device may enter the East (West) device through Port E1 (W3). The blocking of laser pump light 1004 from entering the laser of the East device is discussed below with reference to FIG. 12B. The discussion of the blocking of laser pump light 1002 from entering the laser port of the West device is similar and therefore omitted. By means of this blocking, each device of the present invention behaves as an optical isolator for the laser pump beams as well as for the signal lights.

As illustrated in FIG. 12B, any residual eastbound laser pump light 1004 entering the East device through Port E1 immediately passes into and through the front birefringent walk-off plate 504 where it is physically separated it into two linearly polarized sub-lights 1004C and 1004D. As discussed above, the optical axes of the birefringent plate 504 are oriented such that sub-light 1004C is a horizontally polarized o-ray whilst sub-light 1004D is a vertically polarized e-ray during its respective traverse through plate 504. The separation of sub-lights 1004C and 1004D is effected by the deflection of the e-ray, which is sub-light 1004D. Immediately after leaving front birefringent plate 504, the sub-lights 1004C and 1004D pass through the front $\lambda/2$ plate 505 which, upon passage therethrough, imparts a 45° CCW rotation upon the direction of each of their polarization planes. The two sub-lights 1004C and 1004D then pass towards and through the front lens 508 that collimates them and directs them through either the mirror/waveplate assembly 509 or the selective pass-through non-linear interferometer 519 (both represented as element 580 in FIG. 12B) depending upon whether the device is of the first or the second embodiment of the present invention, respectively. Because the sub-lights 1004C and 1004D are of a wavelength shorter than 1500 nm, then, as discussed above, these sub-lights are transmitted completely therethrough without attenuation. Furthermore, because of the presence of the compensating plates, either $\lambda/4$ plate 608 (FIG. 6) or the first compensating wave plate 814 together with the second compensating wave plate 816 (FIG. 8), these sub-lights are transmitted through either mirror/waveplate assembly 509 or the non-linear interferometer 519 without a change in polarization. The sub-lights 1004C and 1004D then enter and pass through the rear lens 510 which directs them towards and into the Faraday rotator 516B which, upon passage therethrough, imparts a 45° CW rotation (as viewed end-on from the left side of FIG. 12B) upon the direction of each of their polarization planes. After passing through the Faraday rotator 516B, the sub-lights 1004C and 1004D enter and pass through the rear birefringent plate 514. During their passage through rear birefringent plate 514 as shown in FIG. 12B, the sub-lights 1004C and 1004D are horizontally and vertically polarized, respectively. Because the optic axis of rear birefringent plate 514 is symmetrically disposed about a vertical plane with respect to that of front birefringent plate 504, then sub-light 1004C and 1004D pass through rear birefringent plate 514 as an undeflected o-ray and as a deflected e-ray, respectively. As shown in FIG. 12B, the pathways of the o-ray and e-ray within rear birefringent plate 514 are such that the physical separation between the sub-lights 1004C and 1004D increases upon passage therethrough and neither is directed into the Port E8 912. In this way, residual eastbound pump laser light is prevented from entering into the port-namely Port E8 912-from which westbound laser light is injected.

The optical passive components of the present invention provide both additional input and output monitoring capabilities of each of the counter-propagating signal light sets. As noted above in the discussion of laser light injection, these capabilities are possible because of the transmission characteristics of either the mirror/waveplate assembly 509 (FIGS. 6–7) or of the non-linear interferometer 519 (FIG. 8), which are both indicated as element 580 in FIGS. 12A–12D and FIGS. 13A–13D. Thus, a small proportion (<5%) of each sub-signal is transmitted either element 509 or 519 so as to be intercepted by rear lens 510. Furthermore, because of the presence of the compensating plates, either the $\lambda/4$ plate 608 (FIG. 6) or the first compensating wave plate 814 together with the second compensating wave plate 816 (FIG. 8), the transmitted proportions of the sub-signals do not incur a change in polarization during passage through element 509 or 519.

The optical pathway of one monitor signal, namely the monitored proportion of the westbound signal obtained at the East optical passive components device, is described with reference to FIG. 12A. The discussions of the optical pathways of other monitor signals are similar and are therefore omitted. As shown in FIG. 10A and FIG. 12A, the un-amplified westbound signal 1000 enters the East device through Port E3. As shown in FIG. 12A, the signal 1000 first enters the first birefringent walk-off plate 504 where it is physically separated into two sub-signals 1000A and 1000B whose light rays have mutually orthogonal linear polarization plane orientations. As shown in FIG. 12A, the sub-signal 1000A passes through element 504 as a horizontally polarized, undeflected o-ray and the sub-signal 1000B passes through element 504 as a vertically polarized, deflected e-ray. As shown in FIGS. 5A, 9A and 12A, these two sub-signals then pass through the Faraday rotator 506 which imparts a 45° CCW rotation about the propagation direction to each of their polarization planes. The sub-signals 1000A and 1000B then enter and pass through the front lens 508 which collimates them and directs them towards either the reflector/waveplate assembly 509 or the selective pass-through nonlinear interferometer 519. As discussed above, the monitored proportion of each of these sub-signals passes through either element 509 or 519 (both represented as element 580 in FIG. 12A) without a change in polarization plane orientation and passes to and through the rear lens 510.

In FIG. 12A, the monitored proportion 1000E of sub-signal 1000A and the monitored proportion 1000F of sub-signal 1000B are respectively shown as a thin dashed and a thin solid line. As shown in FIGS. 10A and 12A, these monitor sub-signals are focused and directed by rear lens 510 into and through the optical elements adjacent to Port E6. These elements are, in sequence, the rear $\lambda/2$ plate 515A and the rear birefringent plate 514. As shown in FIG. 12A, the rear $\lambda/2$ plate 515A imparts a 45° CCW rotation to the polarization plane directions of each of the sub-signals 1000E and 1000F such that, after passing therethrough, these directions are vertical and horizontal, respectively. After passing through the $\lambda/2$ plate 515A, the monitor sub-signals 1000E and 1000F then enter and pass through the rear birefringent plate 514. Because the optic axis of rear birefringent plate 514 is symmetrically disposed about a vertical plane with respect to that of front birefringent plate 504, then sub-signal 1000E and 1000F pass through rear birefringent plate 514 as a deflected e-ray and as an undeflected o-ray, respectively. Furthermore, since the thickness and material composition of birefringent plates 504 and 514 are identical, the deflection of sub-signal 1000E during its passage through rear birefringent plate 514 is exactly equal and opposite to that of sub-signal 1000B during its passage through front birefringent plate 504. Thus, upon exiting rear birefringent plate 514, the two monitor sub-signals 1000E and 1000F are re-combined so as to generate the monitor signal 1000I. The monitor signal 1000I then exits the device through Port E6.

In the foregoing discussions, the front birefringent plate 504 and the rear birefringent plate 514 have been illustrated as being of similar material and thickness and as being disposed such that their respective optic axes are symmetrically disposed about a vertical plane. The purpose of such conditions is so that sub-signals or separated optical rays separated in one such birefringent plate are readily re-combined in the other such plate. However, one of ordinary skill in the art will readily recognize that such separation and re-combination can be accomplished by other choices of materials, thicknesses and orientations of said two birefringent plates, in various combinations. Such modifications are within the scope and spirit of the present invention.

Figure 14:
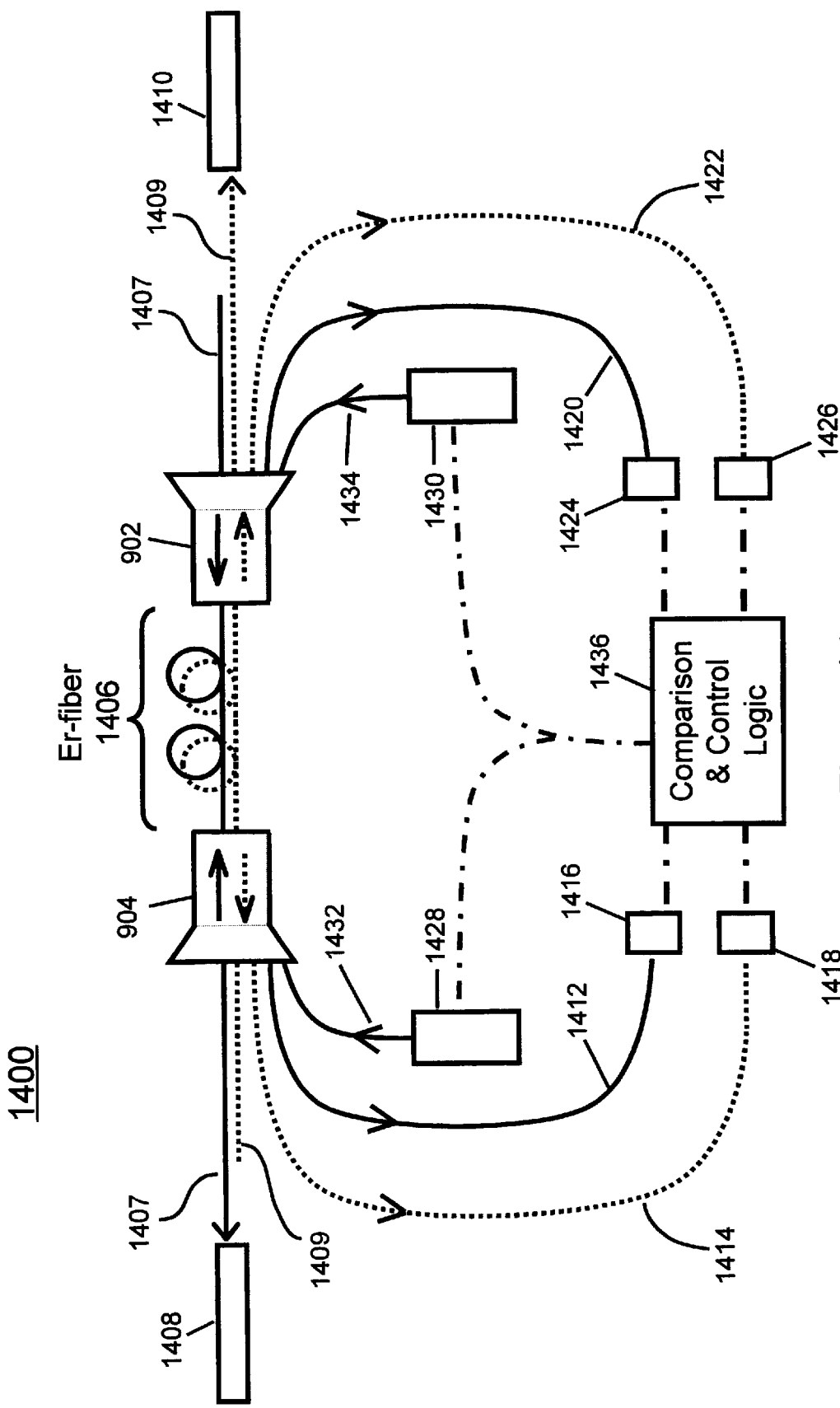
FIG. 14 is a basic block diagram of a bi-directional fiber amplifier system for two light signals propagating in opposite directions in a single fiber optic line showing the assembly of optical passive components according to the present invention.

FIG. 14 shows a bi-directional amplifier system, which includes an integrated isolator, monitor, and amplifier. More particularly, FIG. 14 is a basic block diagram of a band bi-directional Er-doped optical fiber amplifier (EDFA) system 1400 showing the assembly of optical passive components in accordance with the present invention. In FIG. 14, for purposes of example only, a westbound signal is shown as belonging to the "blue" band and an eastbound signal is shown as belonging to the "red" band. A logical West bi-directional optical passive component device 904 (or bi-directional polarization independent optical isolator) and a logical East bi-directional optical passive component device 902 (or bi-directional polarization independent optical isolator), both in accordance with the first embodiment of the present invention, provide the core of the bi-directional amplifier system 1400 shown in FIG. 14. An Er-doped optical fiber (EDF) 1406 disposed between the logical West and East devices is taken as the optical gain element.

With reference to FIGS. 10A, 10B, 11A, 11B and FIG. 14 and as described above, the EDF is optically coupled to Port W3 of the West device 904 and to Port E1 of the East device 902. Mutually counter-propagating westbound signals 1407 of the blue band and eastbound signals 1409 of the red band are coupled from the logical West-side fiber 1408 of the light transmission system to the bi-directional amplifier system 1400 through Port W1 of device 904. These same signals are coupled from the logical East-side fiber 1410 of the light transmission system to the bi-directional amplifier system 1400 through Port E3 of device 902. An optional blue output tap 1412 and optional red input tap 1414, which are optically coupled to Port W5 and Port W8, respectively, of device 904, direct a small monitored proportion of the output blue signal light and of the input red signal light to a first photo-detector 1416 and a second photo-detector 1418, respectively. Likewise, an optional blue input tap 1420 and optional red output tap 1422, which are optically coupled to Port E6 and Port E7, respectively, of device 902, direct a small monitored proportion of the input blue signal light and of the output red signal light to a third photo-detector 1424 and a fourth photo-detector 1426, respectively. A logical West pump laser 1428 and a logical East pump laser 1430 provide the eastbound pump laser light 1432 and westbound pump laser light 1434, respectively. These laser lights are optically coupled into the bi-directional amplifier system through Port W6 of device 904 and Port E8 of device 902. These two laser lights are input to the Er-doped fiber 1406 through Port W3 of device 904 and Port E1 of device 902.

The red-band signal light 1409 and the laser light 1432 propagate together in the eastbound direction through Er-doped fiber 1406 whilst the blue signal light 1407 and the laser light 1434 simultaneously propagate together in the westbound direction through this fiber. By this means, signal 1407 becomes amplified during its traverse through fiber 1406 from device 902 to device 904 and signal 1409 becomes amplified during its traverse from device 904 to device 902. Because device 904 and device 902 comprise signal optical isolator functions, device 904 and device 902 only permit transmission of signals 1407 and 1409, respectively, in directions away from the Er-doped fiber 1406 so that spurious back-reflected signals do not become amplified. Also, device 904 and device 902 only permit transmission of signal 1409 and 1407, respectively in directions towards the Er-doped fiber 1406 so that amplified signals do not exit the amplifier 1400 in incorrect directions. Furthermore, the eastbound laser light 1432 and the westbound laser light 1434 are prevented from entering the East pump laser 1430 and the West pump laser 1428, respectively, so as to prevent damage to either of these lasers. East pump laser 1430 and West pump laser 1428 each operate upon propagating signal light in accordance with the description of co-pump laser 104 and counter-pump laser 105, described herein above with reference to FIG. 1.

Finally, also shown in FIG. 14 is an optional comparison and control logic system 1436 which represents a set of electronic or computer systems together with decision-making software or firmware which monitors the electronic outputs of all the optional photo-detectors and controls the outputs of the two lasers 1428 and 1430 accordingly so as to obtain optimal amplification performance.

Figure 15:
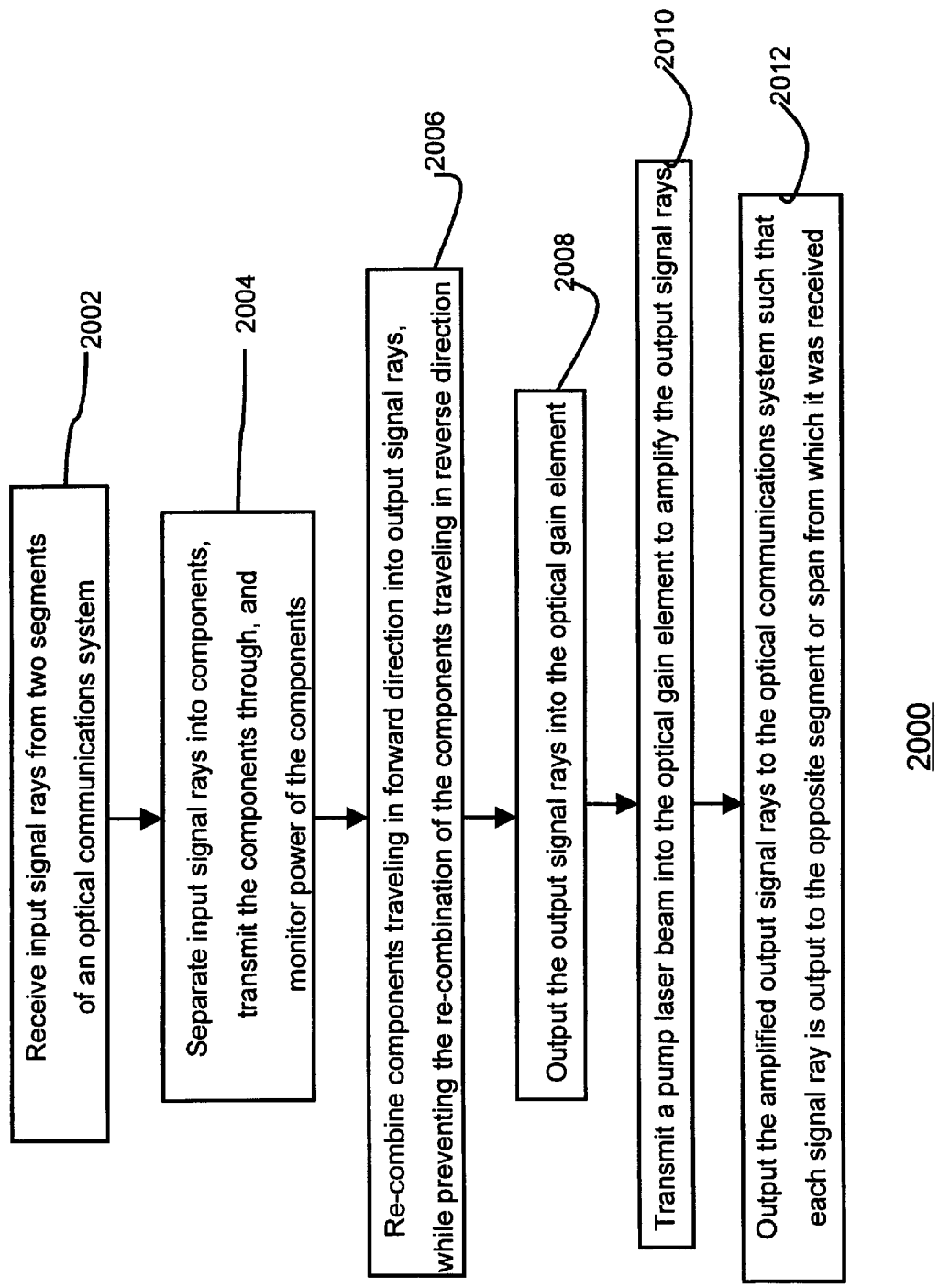
FIG. 15 is a flowchart showing signal ray transmission through the bi-directional polarization independent optical amplifier of the present invention.

FIG. 15 shows a flowchart of the operation of an optical communications systems including the bi-directional polarization independent optical isolator and monitor/amplifier system of the present invention. More particularly, FIG. 15 shows a method 2000 of bi-directional optical amplification of signal rays within an optical communications system.

The method 2000 of FIG. 15 simultaneously inputs 2002 into the bi-directional polarization independent optical isolator and monitor/amplifier system of the present invention two separate signal rays from two different segments or spans of the optical communications system. These two segments are optically coupled to different ends, for instance, an end comprising a logical East bi-directional optical passive component device and an end comprising a logical West bi-directional optical passive component device, of the bi-directional polarization independent optical isolator and monitor/amplifier system. The bi-directional polarization independent optical isolator and monitor/amplifier system of the present invention causes simultaneous transmission of the two separate signal rays in opposite forward directions through the optical gain element while simultaneously suppressing backward transmission of each of the two separate signal rays in its respective reverse direction.

The received input signal rays may be two separate signal rays separated into two, respective and separate wavelength bands.

Alternatively, the two separate signal rays may include two sets of wavelengths, each including a plurality of wavelengths, such that wavelengths of the two signal rays are alternatingly interspersed with each other. More particularly, then, the method of the present invention includes symmetric interleaved and asymmetric interleaved bi-directional wavelength multiplexed optical signal propagation in a light wave communications system including propagating a first set of channels included within a first set of bands in a first direction and a second set of channels included within a second set of bands in a second direction opposite to the first direction, in which the width of bands of the first set of bands either is (symmetric interleaved) or is not (asymmetric interleaved) equal to the width of bands of the second set of bands, and the first and second bands are interleaved with one another.

The bi-directional polarization independent optical isolator and monitor/amplifier system of the present invention then separates 2004 the input signal rays into components, transmits the components through the bi-directional polarization independent optical isolator of the present invention, and monitors the power of the components. More particularly, the bi-directional polarization independent optical isolator and monitor/amplifier system of the present invention monitors the optical power of each of the two signal rays both before its respective input into and after its respective output from the optical gain element.

The bi-directional polarization independent optical isolator and monitor/amplifier system of the present invention re-combines 2006 the components traveling in the forward direction into output signal rays, while preventing the re-combination of the components traveling in the reverse direction. Subsequently the bi-directional polarization independent optical isolator and monitor/amplifier system of the present invention simultaneously outputs 2008 the two separate signal rays into opposite ends of the optical gain element; both signal rays are simultaneously amplified within the optical gain element and an output end of the first of the two signal rays is an input end of the second of the two signal rays and an output end of the second of the two signal rays is an input end of the first of the two signal rays.

In addition, the bi-directional polarization independent optical isolator of the present invention transmits 2010 pump laser beams into the optical gain element to amplify the output signal rays. More particularly, the bi-directional polarization independent optical isolator and monitor/amplifier system of the present invention transmits a pump laser beam through the optical gain element in a same direction as a first of the two signal rays and transmits another pump laser beam through the optical gain element in a same direction as a second of the two signal rays. Each of said pump laser beams is prevented by the bi-directional polarization independent optical isolator of the present invention from being output at the input of the other of the pump laser beams.

Finally, the bi-directional polarization independent optical isolator and monitor/amplifier system of the present invention outputs 2012 the output signal rays into the two segments or spans of the optical communications system such that the signal ray that was received from the first such segment is output to the second segment, and vice versa.

The present invention has been described with respect to the above-mentioned embodiments, but is not limited thereto.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention as described in the appended claims.

What is claimed is:

1. A bi-directional fiber amplifier system for two light signals propagating in opposite directions in a single fiber optic line, comprising:

an optical gain element propagating therethrough the two light signals;

bi-directional polarization independent optical isolators coupled to the optical gain element and simultaneously inputting the two separate light signals from opposite ends of the optical gain element, said bi-directional polarization independent optical isolators causing simultaneous transmission of the two separate light signals in opposite forward directions while simultaneously suppressing backward transmission of each of the two separate light signals in its respective reverse direction; and pump lasers, respectively coupled to each of the bi-directional polarization independent optical isolators, and amplifying the two separate light signals in the optical gain element.

2. The bi-directional fiber amplifier system as recited in claim 1, further comprising photo-detectors measuring a power of the two separate light signals.

3. The bi-directional fiber amplifier system as recited in claim 2, further comprising a comparison and control logic system monitoring the photo-detectors and controlling outputs of the pump lasers accordingly.

4. A bi-directional polarization independent optical amplifier system simultaneously transmitting two separate signal rays in opposite forward directions while simultaneously suppressing backward transmission of each of the two separate signal rays in its respective reverse direction, said bi-directional polarization independent optical amplifier system comprising:

an optical gain element comprising two ends;

a first bi-directional polarization independent optical isolator optically coupled to a first end of the optical gain element; and a second bi-directional polarization independent optical isolator optically coupled to a second end of the optical gain element, wherein said two separate signal rays are separated from each other based upon their respective wavelengths.

5. The bi-directional polarization independent optical amplifier system as recited in claim 4, wherein each of the first bi-directional polarization independent optical isolator and the second bi-directional polarization independent optical isolator comprises:

a birefringent polarization element separating each of the two separate signal rays into components thereof upon a first traverse therethrough and selectively re-combining the components of the two separate signal rays into two respective output signal rays upon a second traverse therethrough, a reciprocal optical rotation element, a non-reciprocal optical rotation element, said reciprocal optical rotation element and said non-reciprocal optical rotation element together selectively rotating the direction of the plane of polarization of both of the components of each of the two separate signal rays depending upon the transmission direction of the each of the two signal rays, a reflective element reflecting the components of each of the two separate signal rays and selectively rotating both of the components of one of the two separate signal rays and comprising a mirror/waveplate assembly, a lens collimating and directing the components of the two separate signal rays traveling in a forward direction onto the reflective element, and focusing the reflected components onto the birefringent polarization element, wherein said two separate signal rays are separated into two, respective and separate wavelength bands.

6. The bi-directional polarization independent optical amplifier system as recited in claim 5, further comprising:

a first assembly of four parallel optical ports optically coupled to the first bi-directional polarization independent optical isolator such that corresponding input and output of each pass of the two separate signal rays through the first isolator is coupled to a pair of diagonally disposed ports, and a second assembly of four parallel optical ports optically coupled to the second bi-directional polarization independent optical isolator such that corresponding input and output of each pass of the two separate signal rays through the second isolator is coupled to a pair of diagonally disposed ports.

7. The bi-directional polarization independent optical amplifier system as recited in claim 6, further comprising:

a first monitor/amplifier assembly optically coupled to the first bi-directional polarization independent optical isolator, and a second monitor/amplifier assembly optically coupled to the second bi-directional polarization independent optical isolator, wherein each of the first monitor/amplifier assembly and the second monitor/amplifier assembly monitors a first portion of the components of each of the two separate signal rays traveling in its respective forward direction and amplifies another portion of the components of each of the two separate signal rays traveling in its respective forward direction.

8. The bi-directional polarization independent optical amplifier system as recited in claim 7, wherein each of the first monitor/amplifier assembly and the second monitor/amplifier assembly comprises:

an input monitor monitoring each first portion of the components, a laser pump amplifying each another portion of the components by injecting a laser pump beam into the optical path of the another portion of the components of the two separate signal rays traveling in the forward direction, and a monitor/amplifier lens focusing the components onto the monitor and collimating and directing the laser pump beam onto the reflective element.

9. The bi-directional polarization independent optical amplifier system as recited in claim 8, wherein each of the first monitor/amplifier assembly and the second monitor/amplifier assembly further comprises:

a monitor/amplifier birefringent polarization element separating a pump laser beam traveling therethrough into components thereof and selectively re-combining the first portion of the components of the each of the two separate signal rays into two respective monitor signal rays upon a traverse therethrough;

a first monitor/amplifier reciprocal optical rotation element selectively rotating the direction of the plane of polarization of light rays passing therethrough;

a second monitor/amplifier reciprocal optical rotation element selectively rotating the direction of the plane of polarization of light rays passing therethrough; and a monitor/amplifier non-reciprocal rotating optical rotation element selectively rotating the direction of the plane of polarization of light rays passing therethrough, wherein the birefringent polarization element, the reciprocal optical rotation element, the non-reciprocal optical rotation element, the lens, the monitor/amplifier lens, the monitor/amplifier birefringent polarization element, the first monitor/amplifier reciprocal optical rotation element, the second monitor/amplifier reciprocal optical rotation element, and the monitor/amplifier non-reciprocal optical rotation element are configured such that the components of each of the two separate signal rays traveling in its respective forward direction are monitored and amplified.

10. The bi-directional polarization independent optical amplifier system as recited in claim 9, wherein each of the first monitor/amplifier assembly and the second monitor/amplifier assembly further comprises an assembly of four parallel optical ports optically coupled to the monitor/amplifier birefringent polarization element and receiving the portion of the components and transmitting the laser pump beam.

11. The bi-directional polarization independent optical amplifier system as recited in claim 6, wherein the first end of the optical gain element is optically coupled to a first port of the first assembly of four parallel optical ports and the second end of the optical gain element is optically coupled to a first port of the second assembly of four parallel optical ports and a second port and a third port of the first assembly of four parallel optical ports are optically coupled to one another and a second port and a third port of the second assembly of four parallel optical ports are optically coupled to one another such that an output of a second pass of a first signal ray of the two signal rays through the first bi-directional polarization independent optical isolator is output from the first bi-directional polarization independent optical isolator to said optical gain element and an output of a second pass of a second signal ray of the two signal rays through the second bi-directional polarization independent optical isolator is output from the second bi-directional polarization independent optical isolator to said optical gain element.

12. The bi-directional polarization independent optical amplifier system as recited in claim 11, wherein the output of a second pass of the first signal ray from the first bi-directional polarization independent optical isolator is amplified by the optical gain element wherein a first pump laser beam propagates together with said first signal ray output along its forward direction within the optical gain element and the output of a second pass of the second signal ray from the second bi-directional polarization independent optical isolator is amplified by the optical gain element wherein a second pump laser beam propagates together with said second signal ray output along its forward direction within the optical gain element.

13. The bi-directional polarization independent optical amplifier as recited in claim 4, wherein each of the first bi-directional polarization independent optical isolator and the second bi-directional polarization independent optical isolator comprises:
  a birefringent polarization element separating each of the two separate signal rays into components thereof upon a first traverse therethrough and selectively re-combining the components of the two separate signal rays into two respective output signal rays upon a second traverse therethrough,
  a reciprocal optical rotation element,
  a non-reciprocal optical rotation element, said reciprocal optical rotation element and said non-reciprocal optical rotation element together selectively rotating the direction of the plane of polarization of both of the components of each of the two separate signal rays depending upon the transmission direction of the each of the two signal rays,
  a reflective element reflecting the components of each of the two separate signal rays and selectively rotating both of the components of one of the two separate signal rays and comprising a non-linear interferometer,
  a lens collimating and directing the components of the two separate signal rays traveling in a forward direction onto the reflective element, and focusing the reflected components onto the birefringent polarization element, wherein said two separate signal rays include two sets of wavelengths, each of the two sets of wavelengths including a plurality of wavelengths, such that wavelengths of the two signal rays are alternatingly interspersed with each other.

14. The bi-directional polarization independent optical amplifier system as recited in claim 13, further comprising:
  a first assembly of four parallel optical ports optically coupled to the first bi-directional polarization independent optical isolator such that corresponding input and output of each pass of the two separate signal rays through the first isolator is coupled to a pair of diagonally disposed ports, and
  a second assembly of four parallel optical ports optically coupled to the second bi-directional polarization independent optical isolator such that corresponding input and output of each pass of the two separate signal rays through the second isolator is coupled to a pair of diagonally disposed ports.

15. The bi-directional polarization independent optical amplifier system as recited in claim 14, further comprising:
  a first monitor/amplifier assembly optically coupled to the first bi-directional polarization independent optical isolator, and
  a second monitor/amplifier assembly optically coupled to the second bi-directional polarization independent optical isolator, wherein each of the first monitor/amplifier assembly and the second monitor/amplifier assembly monitors a first portion of the components of each of the two separate signal rays traveling in its respective forward direction and amplifies another portion of the components of each of the two separate signal rays traveling in its respective forward direction.

16. The bi-directional polarization independent optical amplifier system as recited in claim 15, wherein each of the first monitor/amplifier assembly and the second monitor/amplifier assembly comprises:
  an input monitor monitoring each first portion of the components,
  a laser pump amplifying each another portion of the components by injecting a laser pump beam into the optical path of the another portion of the components of the two separate signal rays traveling in the forward direction, and
  a monitor/amplifier lens focusing the components onto the monitor and collimating and directing the laser pump beam onto the reflective element.

17. The bi-directional polarization independent optical amplifier system as recited in claim 16, wherein each of the first monitor/amplifier assembly and the second monitor/amplifier assembly further comprises:
  a monitor/amplifier birefringent polarization element separating a pump laser beam traveling therethrough into components thereof and selectively re-combining the first portion of the components of the each of the two separate signal rays into two respective monitor signal rays upon a traverse therethrough;
  a first monitor/amplifier reciprocal optical rotation element selectively rotating the direction of the plane of polarization of light rays passing therethrough;
  a second monitor/amplifier reciprocal optical rotation element selectively rotating the direction of the plane of polarization of light rays passing therethrough; and
  a monitor/amplifier non-reciprocal rotating optical rotation element selectively rotating the direction of the plane of polarization of light rays passing therethrough, wherein the birefringent polarization element, the reciprocal optical rotation element, the non-reciprocal optical rotation element, the lens, the monitor/amplifier lens, the monitor/amplifier birefringent polarization element, the first monitor/amplifier reciprocal optical rotation element, the second monitor/amplifier reciprocal optical rotation element, and the monitor/amplifier non-reciprocal optical rotation element are configured such that the components of each of the two separate signal rays traveling in its respective forward direction are monitored and amplified.

18. The bi-directional polarization independent optical amplifier system as recited in claim 17, wherein each of the first monitor/amplifier assembly and the second monitor/amplifier assembly further comprises an assembly of four parallel optical ports optically coupled to the monitor/amplifier birefringent polarization element and receiving the portion of the components and transmitting the laser pump beam.

19. The bi-directional polarization independent optical amplifier system as recited in claim 14, wherein the first end of the optical gain element is optically coupled to a first port of the first assembly of four parallel optical ports and the second end of the optical gain element is optically coupled to a first port of the second assembly of four parallel optical ports and a second port and a third port of the first assembly of four parallel optical ports are optically coupled to one another and a second port and a third port of the second assembly of four parallel optical ports are optically coupled to one another such that an output of a second pass of a first signal ray of the two signal rays through the first bi-directional polarization independent optical isolator is output from the first bi-directional polarization independent optical isolator to said optical gain element and an output of a second pass of a second signal ray of the two signal rays through the second bi-directional polarization independent optical isolator is output from the second bi-directional polarization independent optical isolator to said optical gain element.

20. The bi-directional polarization independent optical amplifier system as recited in claim 19, wherein the output of a second pass of the first signal ray from the first bi-directional polarization independent optical isolator is amplified by the optical gain element wherein a first pump laser beam propagates together with said first signal ray output along its forward direction within the optical gain element and the output of a second pass of the second signal ray from the second bi-directional polarization independent optical isolator is amplified by the optical gain element wherein a second pump laser beam propagates together with said second signal ray output along its forward direction within the optical gain element.

\* \* \* \* \*